(12) United States Patent
Tsang

(10) Patent No.: US 9,164,481 B2
(45) Date of Patent: Oct. 20, 2015

(54) GENERATING AND DISPLAYING HOLOGRAMS

(75) Inventor: Peter Wai Ming Tsang, Hong Kong (CN)

(73) Assignee: CITY UNIVERSITY OF HONG KONG, Kowloon (HK)

(*) Notice: Subject to any disclaimer, the term of this patent is extended or adjusted under 35 U.S.C. 154(b) by 489 days.

(21) Appl. No.: 13/603,895

(22) Filed: Sep. 5, 2012

(65) Prior Publication Data

US 2014/0065520 A1    Mar. 6, 2014

(51) Int. Cl.
G03H 1/08       (2006.01)
G03H 1/22       (2006.01)
G03H 1/02       (2006.01)
G03H 1/00       (2006.01)

(52) U.S. Cl.
CPC .............. G03H 1/2294 (2013.01); G03H 1/02 (2013.01); G03H 1/0808 (2013.01); G03H 2001/0022 (2013.01); G03H 2001/0224 (2013.01); G03H 2001/0816 (2013.01); G03H 2210/30 (2013.01); G03H 2223/23 (2013.01); G03H 2225/23 (2013.01); G03H 2225/31 (2013.01); G03H 2225/55 (2013.01)

(58) Field of Classification Search
None
See application file for complete search history.

(56) References Cited

U.S. PATENT DOCUMENTS

| 7,295,200 B2 | 11/2007 | Cameron et al. |
| 7,564,606 B2 | 7/2009 | Kitamura |
| 7,923,677 B2 * | 4/2011 | Slinger .................... 250/216 |
| 2015/0077818 A1 * | 3/2015 | Tsang ......................... 359/9 |
| 2015/0131133 A1 * | 5/2015 | Tsang ................. G03H 1/0866 |

OTHER PUBLICATIONS

S.C. Kim and E.S. Kim, "Fast computation of hologram patterns of a 3D object using run-length encoding and novel look-up table methods," Appl. Opt. 48, pp. 1030-1041, 2009.
T. Yamaguchi, G. Okabe, H. Yoshikawa, "Real-time image plane full-color and full-parallax holographic video display system", Opt. Eng., vol. 46, pp. 125801-126000, 2007.
H. Yoshikawa, "Fast computation of fresnel holograms employing difference", Opt. Rev., vol. 8, No. 5, pp. 331-335, 2001.
P.W.M. Tsang, J.-P. Liu, K.W.K. Cheung, and T.-C. Poon, "Fast generation of Fresnel holograms based on multirate filtering", Appl. Opt. 48, H23-H30, (2009).
Hironobu Sakata and Yuji Sakamoto, "Fast computation method for a Fresnel hologram using three-dimensional affine transformations in real space," Appl. Opt. 48, H212-H221 (2009).

(Continued)

*Primary Examiner* — Arnel C Lavarias
(74) *Attorney, Agent, or Firm* — Amin, Turocy & Watson, LLP

(57) ABSTRACT

Techniques for generating 3-D holographic images of a 3-D real or synthetic object scene are presented. A holographic generator component (HGC) can obtain a real or synthetic 3-D object scene. The HGC generates a high-resolution grating, and generates a low-resolution mask based on the 3-D object scene. The HGC overlays the mask on the grating to generate the hologram, which can be a digital mask programmable hologram. The HGC can use the grating as an encryption key, if desired, wherein the mask can be encrypted based on the encryption key. The display component receives the hologram and can generate holographic images, based on the hologram, and display the holographic images using one or more low-resolution displays. The grating and display can be arranged in various formations in relation to each other. A single display can be partitioned into a tile structure for displaying holographic images in the respective tiles.

29 Claims, 21 Drawing Sheets

(56) References Cited

OTHER PUBLICATIONS

Tomoyoshi Shimobaba, Hirotaka Nakayama, Nobuyuki Masuda and Tomoyoshi Ito, "Rapid calculation of Fresnel computer-generated-hologram using look-up table and wavefront-recording plane methods for three-dimensional display", Optics Express, 18, 19, (2010).

P.W.M. Tsang, W.-K. Cheung, T.-C. Poon, and C. Zhou, "Holographic video at 40 frames per second for 4-million object points," Optics Express 19, 15205-15211 Aug. 2011.

P. W. M. Tsang, T.-C. Poon, K.W. K. Cheung, "Real-time relighting of digital holograms based on wavefront recording plane method," Opt. Exp., vol. 20, Issue 6, pp. 5962-5967, (Mar. 2012).

P. W. M. Tsang, K. W. K. Cheung, and T.-C. Poon, "Enhancing the pictorial content of Digital Holograms at 100 frames per second," Optics Express, vol. 20, Iss. 13, pp. 14183-14188, (2012).

H. Yoshikawa and M. Tachinanni, "Development of direct fringe printer for computer-generated holograms," SPIE Proc. vol. 5742-259 (2005).

* cited by examiner

US 9,164,481 B2

GENERATING AND DISPLAYING HOLOGRAMS

TECHNICAL FIELD

The subject disclosure relates generally to holograms, and in particular, to generating and displaying holograms.

BACKGROUND

With the advancement of computers, digital holography has become an area of interest and has gained some popularity. Conventionally, a Fresnel hologram of a three-dimensional scene can be generated numerically by computing the fringe patterns emerged from each object point to the hologram plane. Research findings derived from digital holography technology have demonstrated the possibility for generating holograms (e.g., medium-sized holograms) for representing three-dimensional (3-D) scenes that can contain a relatively large number of object points. Some techniques have been able to generate and process digital holograms at video rates with the use of the wavefront recording plane.

While these results are encouraging, they are shrouded by the lack of high-resolution real-time spatial light modulators (SLMs) (e.g., SLMs of 5 microns or less) for displaying the digital holograms. Although higher resolution holographic displays can be implemented with the integration of an active tiling method and optically addressed SLMs (OASLMs), the cost of such systems can be expensive, and implementation of such systems also can be complex.

The above-described description is merely intended to provide a contextual overview of generating and displaying digital holograms, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

Systems, methods, computer readable storage mediums, and techniques disclosed herein relate to generating holograms. Disclosed herein is a system comprising at least one memory that stores computer executable components, and at least one processor that facilitates execution of the computer executable components stored in the at least one memory. The computer executable components comprising a holographic generator component that generates a hologram, based at least in part on an object scene, wherein the hologram corresponds to the object scene. The computer executable components also including a facilitator component that generates a grating, generates a mask based at least in part on the object scene, and overlays the mask on the grating to facilitate generation of the hologram by the holographic generator component.

Also disclosed herein is a method that includes generating, by a system including at least one processor, a grating pattern. The method also includes generating, by the system, a mask pattern based at least in part on an object scene and the grating pattern. The method further includes overlaying, by the system, the mask pattern on to the grating pattern to facilitate generating a hologram that corresponds to the object scene.

Further disclosed herein is a non-transitory computer readable storage medium comprising computer executable instructions that, in response to execution, cause a system including a processor to perform operations. The operations include generating a grating image. The operations also include generating a mask image based at least in part on a three-dimensional object scene and the grating image. The operations further include overlaying the mask image on to the grating image to facilitate generating a hologram that corresponds to the three-dimensional object scene.

The disclosed subject matter also includes a system comprising means for generating a grating. The system also includes means for generating a mask based at least in part on a three-dimensional object scene and the grating. The system further includes means for superposing the mask and the grating to facilitate generating a hologram that corresponds to the three-dimensional object scene.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
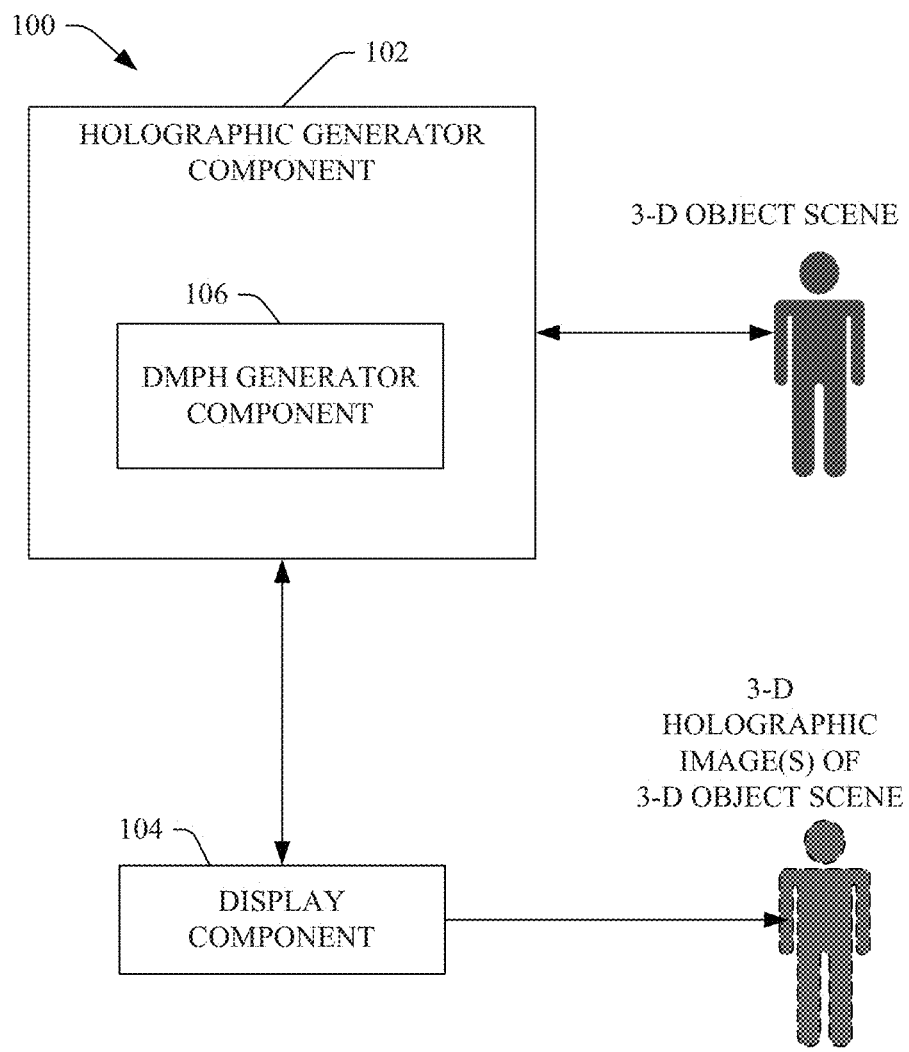
FIG. 1 illustrates a block diagram of an example system that can efficiently generate a three-dimensional (3-D) hologram(s) (e.g., full-parallax 3-D Fresnel hologram(s)) of a real or synthetic 3-D object scene(s) in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

With the advancement of computers, digital holography has become an area of interest and has gained some popularity. Conventionally, a Fresnel hologram of a three-dimensional scene can be generated numerically by computing the fringe patterns emerged from each object point to the hologram plane. Research findings derived from digital holography technology have demonstrated the possibility for generating holograms (e.g., medium-sized holograms) for representing three-dimensional (3-D) scenes that can contain a relatively large number of object points. Some techniques have been able to generate and process digital holograms at video rates with the use of the wavefront recording plane.

While these results are encouraging, conventional techniques for generating and displaying holograms have deficiencies. For instance, there are significant problems in displaying digital holograms due to the lack of high-resolution real-time spatial light modulators (SLMs) (e.g., SLMs of 5 microns or less) that may be used for displaying the holograms. Also, although higher resolution holographic displays can be implemented with the integration of an active tiling method and optically addressed SLMs (OASLMs), the cost of such systems can be expensive, and implementation of such systems also can be complex.

Still another problem with conventional display techniques is due to the resolution of existing display media, such as SLMs, liquid crystal on silicon (LCoS), and image setters, which can be significantly lower than the wavelength of light. A typical SLM can have a dot-pitch of 10 μm, but the resolution is significantly behind the desired resolution for a decent holographic display. Generally, for a hologram to deliver a reconstructed holographic image with reasonable quality, it can be desirable for the dot-pitch to be 5 μm or less. However, a SLM or LCoS below 5 μm is generally not available in the market, and currently displays having a resolution below 5 μm are fabricated in a laboratory environment and are relatively expensive. Further, the size of the SLM or LCoS can be rather small, normally within 2 cm square.

Another technique for producing holograms is to produce the hologram on a photographic film with a fringe printer. However, this technique can be very time consuming and is generally only applicable to handle the display of static holographic images.

To that end, techniques for generating and displaying three-dimensional (3-D) holograms (e.g., full-parallax 3-D Fresnel holograms) of a real or synthetic 3-D object scene are presented. A holographic generator component (HGC) can receive (e.g., obtain) a real 3-D object scene (e.g., a captured scene), or can generate or receive a synthetic 3-D object scene. The HGC can generate a digital 3-D hologram (e.g., full-parallax 3-D Fresnel hologram) to facilitate generating, reconstructing, and displaying digital 3-D holographic images (e.g., 3-D Fresnel holographic images) that can represent or recreate the original real or synthetic 3-D object scene.

In some implementations, the HGC can generate holograms, such as digital mask programmable holograms (DMPHs) that can be different from the classical digital Fresnel holograms. A DMPH can mimic a high-resolution hologram, but also can be displayed using display devices that can have considerably lower resolution. The HGC can produce a DMPH by the superposition of two images. For instance, the HGC can produce a DMPH that can comprise a static, high-resolution grating (e.g., a static high-resolution image) and a lower-resolution mask (e.g., a lower-resolution image), wherein the lower-resolution mask can be overlaid onto or superpositioned with the high-resolution grating. The HGC can generate a DMPH such that the reconstructed holographic image of the DMPH can be programmed to approximate a target image (e.g., planar target image), including both intensity and depth information, by configuring the pattern of the mask.

The disclosed subject matter also can include a display component for displaying the holograms generated by the HGC. In some implementations, the display component can be associated with (e.g., communicatively connected to) the HGC. The display component can employ a low-resolution display, such as a liquid crystal display (LCD), wherein the lower-resolution mask can be realized using the less stringent display technology (e.g., with a dot-pitch of 20 μm or more). The display component can display the DMPHs for presentation of the 3-D holographic images (e.g., 3-D Fresnel holographic images) to viewers. The disclosed subject matter, by generating holograms, such as DMPHs, which can be reconstructed and displayed using relatively low-resolution displays, such as low-resolution LCD displays, can be significantly more cost efficient than conventional hologram techniques. Also, the disclosed subject matter can configure the display component to produce a display of larger size (e.g., using the lower-resolution display devices) than conventional holographic displays.

Figure 21:
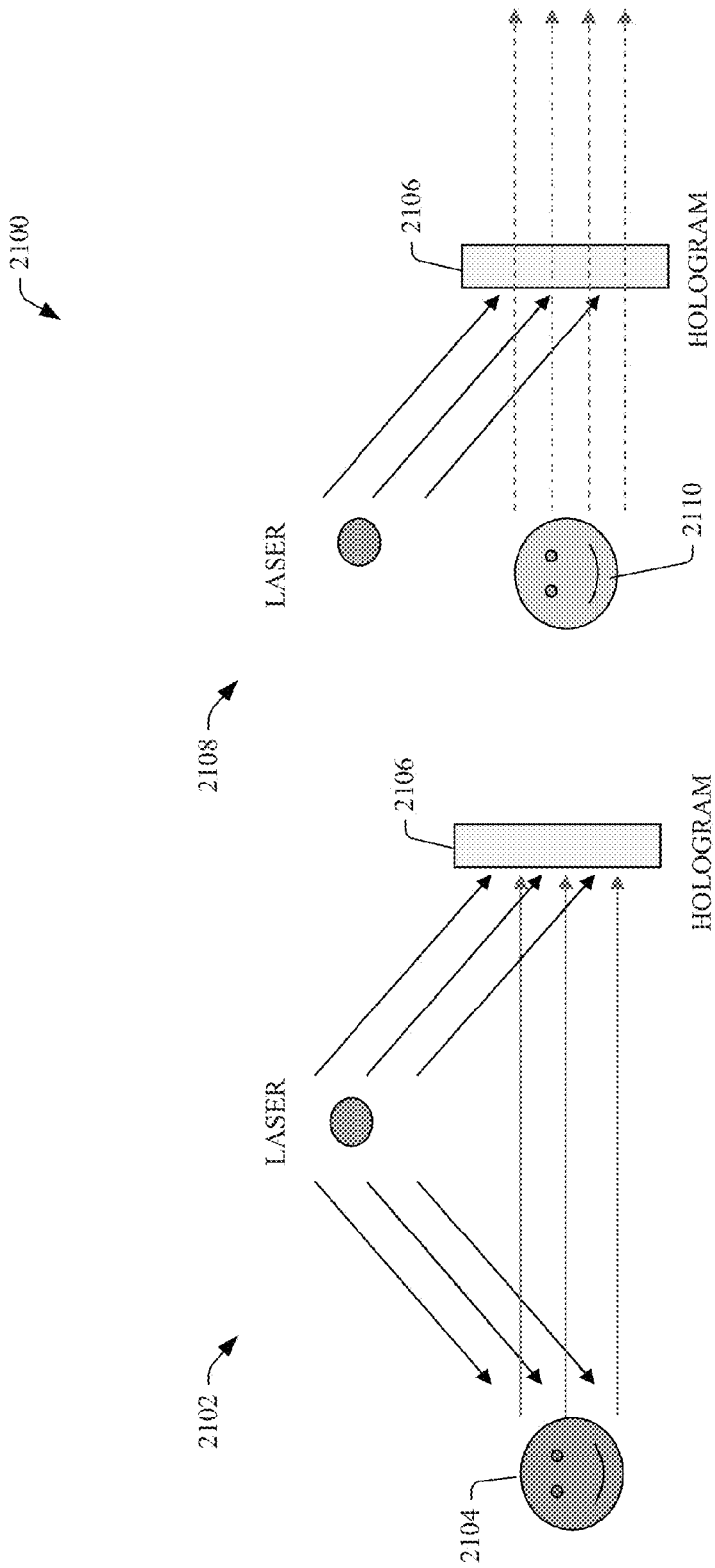
FIG. 21 depicts a diagram of an example optical holography process for generation and use of a hologram to reproduce a 3-D object scene from two-dimensional media.
Figure 22:
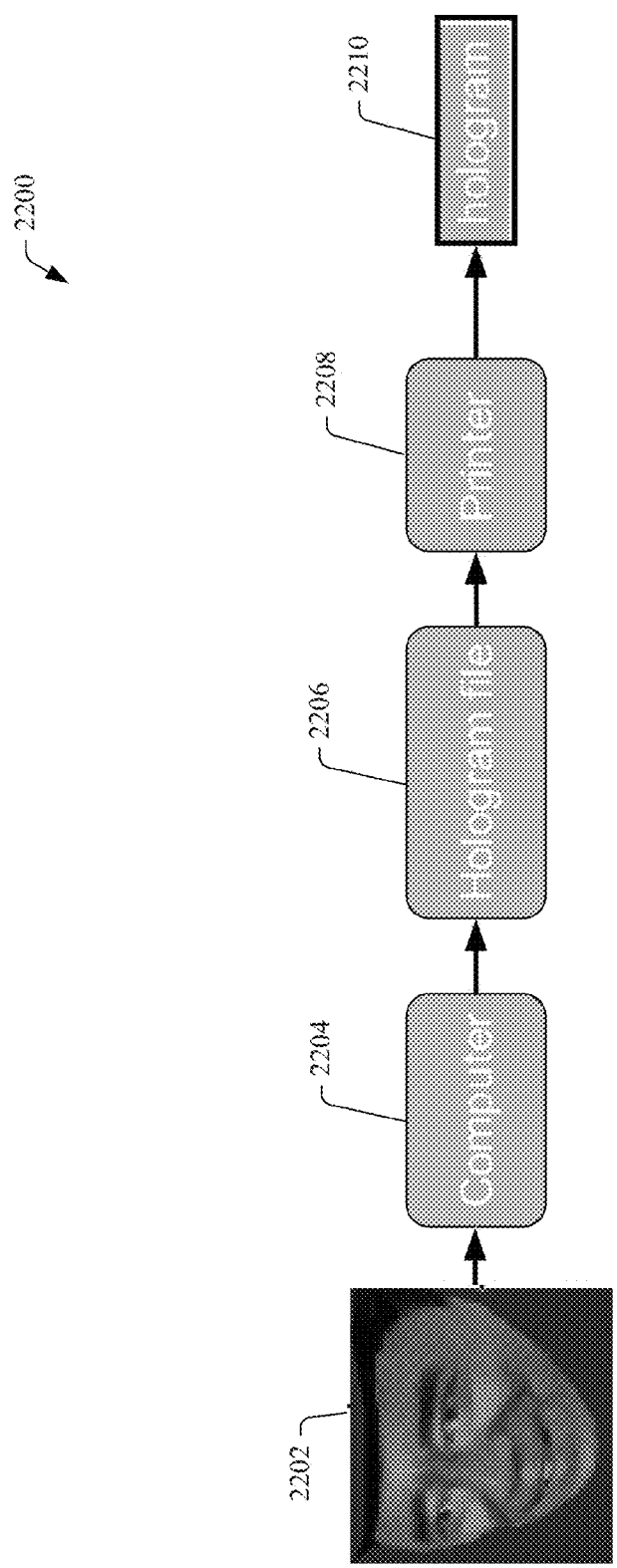
FIG. 22 presents a diagram of an example computer generated holography process for computer generation of a hologram of a 3-D computer graphic model of a synthesized 3-D object scene.
Figure 23:
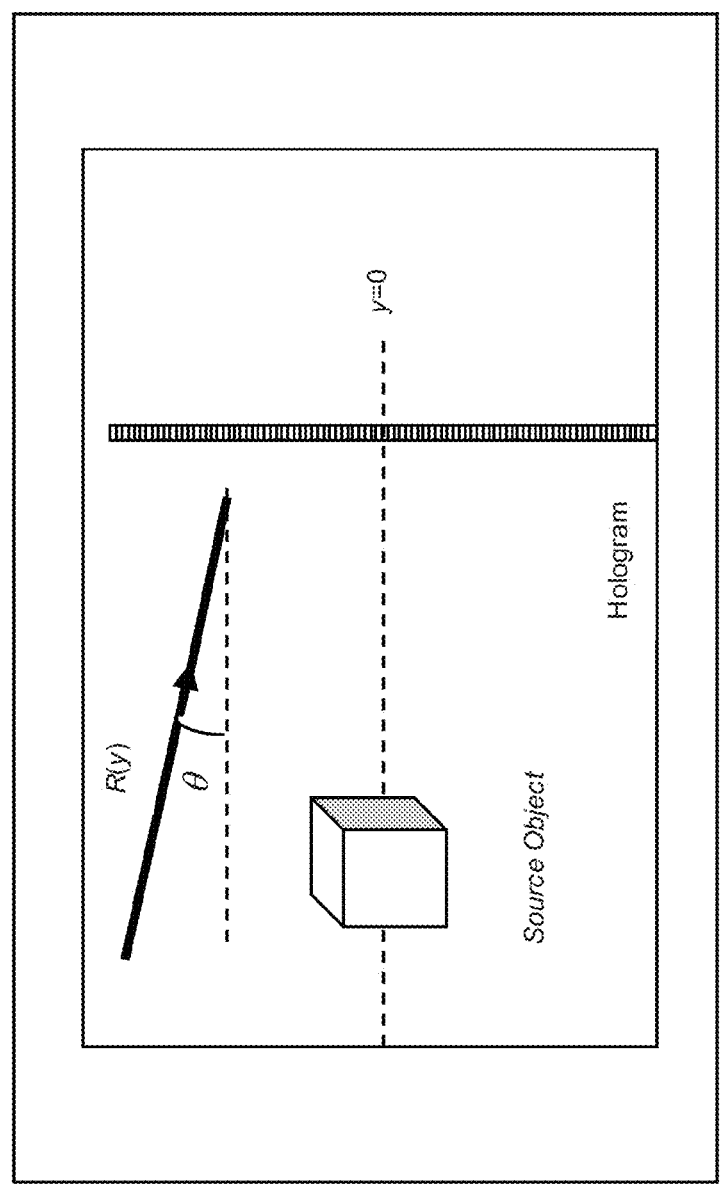
FIG. 23 illustrates a diagram of example holographic process wherein a reference beam can be applied to a diffraction pattern at a desired incident angle to facilitate generating the hologram.

Turning to the drawings, and referring initially to FIGS. 21-23, FIG. 21 illustrates a diagram of an example optical holography process 2100 for generation and use of a hologram to reproduce a 3-D object scene from two-dimensional (2-D) media (e.g., film). As part of the optical holography process 2100, as depicted at 2102, a 3-D object scene 2104 can be recorded or obtained using, for example, a laser and/or a capturing device, to generate a hologram 2106 that can comprise 2-D images (e.g., 2-D images of a 3-D object image from various perspectives). The hologram 2106 can be recorded on media (e.g., 2-D media, such as film). As further part of the optical holography process 2100, as depicted at 2108, a laser (e.g., reference beam) can be applied to the hologram 2106 to generate or reconstruct 3-D holographic images 2110 that can represent or recreate the original 3-D object scene.

FIG. 22 depicts a diagram of an example computer generated holography (CGH) process 2200 for computer generation of a hologram of a 3-D computer graphic model of a synthesized 3-D object scene. The CGH process 2200 can be used to generate holograms numerically from 3-D computer-generated models that synthesize a 3-D object scene that does not exist in the real world.

As part of the CGH process 2200, at 2202, a computer-graphic model of a 3-D object scene can be generated (e.g., by a computer). The computer-graphic model of a 3-D object scene can depict the 3-D object scene from various perspectives (e.g., encompassing a 360-degree perspective). At 2204, a computer (e.g., employing an image generator) can be used to generate a hologram file associated with the computer-graphic model of a 3-D object scene, as shown at 2206. The hologram file can be an electronic file comprising data that, for each 3-D image of the scene, can correspond or relate to a desired number of 2-D images from various perspectives of the 3-D image that together (e.g., when integrated) can make up (e.g., reconstruct) the 3-D image.

At 2208, a printer (e.g., fringe printer) can be used to generate a hologram (e.g., 3-D Fresnel hologram) that can be recorded, printed, or contained on a desired media (e.g., 2-D media, such as film), as shown at 2210. For a 3-D object image or scene (e.g., computer-graphic model of a 3-D object scene), the CGH process 2200 can generate a Fresnel hologram numerically as the real part of the product of the object (e.g., 3-D object image) and planar reference waves. A 3-D Fresnel holographic image or scene can be reconstructed using the Fresnel hologram and a reference beam (e.g., laser).

For example, a planar object can generate a diffraction pattern D(x,y), which can result in a hologram after adding a reference beam. Given a set of 3-D object points O=[$o_0(x_0, y_0, z_0), o_1(x_1, y_1, z_1), \ldots, o_{N-1}(x_{N-1}, y_{N-1}, z_{N-1})$], the diffraction pattern D(x, y) can be generated numerically with the following equation:

$$D(x, y) = \sum_{j=0}^{N_p-1} \frac{a_j}{r_j} \exp(ikr_j) = \sum_{j=0}^{N_p-1} \left[ \frac{a_j}{r_j} \cos(kr_j) + i\frac{a_j}{r_j} \sin(kr_j) \right]$$

where $a_j$ and $r_j$ represent the intensity of the 'jth' point in O (e.g., source object) and its distance to the position (x, y) on the diffraction plane, $$k = \frac{2\pi}{\lambda}$$

is the wavenumber and λ is the wavelength of the reference beam. Subsequently, a hologram H(x, y) can be generated by adding a reference beam (R(x,y)) to the diffraction pattern (D(x,y)), in accordance with the following equation:

$$H(x,y)=Re\{D(x,y)R^*(x,y)\}$$

In a relatively simple case, R(x,y) can be a plane wave R(y). Referring briefly to FIG. 23, illustrated is a diagram of example holographic process 2300 wherein a reference beam R(y) can be applied to a diffraction pattern at a desired incident angle θ to facilitate generating the hologram.

In some implementations, an electronically-accessed display unit(s), such as an SLM, an LCoS, or an LCD, can be used to enable computer generated holograms to be displayed in real time without the need of producing hardcopies with photographic techniques or an expensive fringe writer.

Turning to FIG. 1, illustrated is a block diagram of an example system 100 that can efficiently generate a three-dimensional (3-D) hologram(s) (e.g., full-parallax 3-D Fresnel hologram(s)) of a real or synthetic 3-D object scene(s) in accordance with various aspects and embodiments of the disclosed subject matter. In an aspect, the system 100 can include a holographic generator component (HGC) 102 that can desirably generate a hologram (e.g., sequence of 3-D holographic images) that can represent a 3-D object scene (e.g., real or computer-synthesized 3-D object scene) from multiple different viewing perspectives that can correspond to multiple different viewing perspectives of the 3-D object scene. The hologram can be used to generate, reconstruct, or reproduce 3-D holographic images for display to one or more viewers, wherein the 3-D holographic images can represent or recreate the original 3-D object scene from multiple visual perspectives. In some embodiments, the HGC 102 and/or other components (e.g., display component 104) of the system 100 can be part of a multiple-view aerial holographic projection system (MVAHPS) that can generate and display a 3-D holographic image(s) of a 3-D real or synthetic, static or animated, object scene viewable from multiple perspectives (e.g., multiple angles in relation to the 3-D object scene), wherein the 3-D holographic image can be viewed, for example, as a 3-D image floating in mid-air in a desired display area (e.g., 3-D chamber). The HGC 102 and display component 104 can facilitate generating and displaying holograms at video rate in real time (e.g., facilitate generating and displaying, for example, a 2048×2048 pixel hologram, which can represent 4 million object points, at 40 frames per second in real time).

The HGC 102 can receive (e.g., obtain) a real 3-D object scene (e.g., captured 3-D object scene), or can generate or receive a synthetic 3-D object scene (e.g., computer generated 3-D object scene). In some implementations, the HGC 102 can generate or receive a computer generated 3-D object scene that can be realized using numerical means without the presence of a physical display (e.g., without the presence of a physical 3-D object scene). Based at least in part on the real or synthetic 3-D object scene, the HGC 102 can generate holograms, such as DMPHs that can mimic high-resolution holograms, but also can be displayed using display devices that can have considerably lower resolution (e.g., a resolution that can correspond to a dot-pitch of 20 microns or more), wherein the generated holograms (e.g., full-parallax 3-D Fresnel holographic images) can represent or recreate the original 3-D object scene from multiple visual perspectives. The HGC 102 can produce a DMPH by the superposition of two images. The HGC 102 can generate a DMPH that can comprise a static, high-resolution grating (e.g., a static high-resolution image), and a lower-resolution mask (e.g., a lower-resolution image), wherein the lower-resolution mask can be overlaid onto or superpositioned with the high-resolution grating. The HGC 102 can generate a DMPH such that the reconstructed holographic image of the DMPH can be programmed to approximate a target image (e.g., target planar image that can be located a defined distance from the hologram), including both intensity and depth information, by configuring the pattern of the mask.

The system 100 also can include a display component 104 that can be used to display the 3-D holograms generated by the HGC 102. In some implementations, the display component 104 can be associated with (e.g., communicatively connected to) the HGC 102. The display component 104 can employ a low-resolution display, such as, for example, a low-resolution LCD or LCoS, wherein the lower-resolution mask can be realized using the less stringent (e.g., relatively lower resolution) display technology (e.g., with a dot-pitch of 20 μm or more). The display component 104 can display the DMPHs for presentation of the 3-D holographic images (e.g., 3-D Fresnel holographic images) to viewers.

The HGC 102 can include a DMPH generator component 106 (also referred to herein as a hologram generator facilitator component or a facilitator component) that can generate the 3-D holograms, which can be or can include 3-D DMPHs. The DMPH generator component 106 can generate a first image $G(x, y)$ that can be a static, high-resolution grating image, which also can be referred to as the grating or grating pattern, and can be composed of a two-dimensional (2-D) array of sample object points. In accordance with various embodiments, the DMPH generator component 106 can assign each sample object point a level of transparency ranging from totally transparent, which can be denoted by a first value, such as 0, to totally opaque, which can be denoted by a second value, such as 1. Each sample object point can be taken as a pixel of the grating.

In some embodiments, the DMPH generator component 106 can assign a binary value, which can be either 0 or 1 (e.g., either transparent or opaque), to each of the object points or pixels in the grating is binary, and a grating with such pixel property can be referred to as a binary grating. For instance, the binary grating can be in the form of, for example, a checkerboard pattern with alternating 0 and 1 pixels along both the horizontal and the vertical directions. In another embodiment, the DMPH generator component 106 can randomly assign binary values to form a random binary pattern. For example, the DMPH generator component 106 can assign each of the object points or pixels a random value of either 0 or 1 according to a probability distribution. In other embodiments, the DMPH generator component 106 can assign each of the object points or pixels respective binary values of either 0 or 1 to form a grating that can have a periodic pattern with the transparency of each pixel varying according to a desired mathematical function (e.g., a cosine function). In still other embodiments, the DMPH generator component 106 can assign each of the object points or pixels random values representing respective degrees of transparency to form the grating.

The DMPH generator component 106 typically can generate the grating image or pattern, based at least in part on one or more defined hologram generation criterion, without regard to the 3-D object scene. In other implementations, the DMPH generator component 106 can generate the grating image or pattern based at least in part on the 3-D object scene and/or one or more defined hologram generation criterion. The one or more defined hologram generation criterion can relate to, for example, a type of object scene, a type of display and/or number of displays (or display partitions) expected to be used to present the holographic images, a desired display resolution for a reconstructed hologram, a type of hologram to be generated, whether the grating image or pattern is being used as an encryption key to encrypt holographic data associated with a hologram, etc.

The DMPH generator component 106 also can generate a second image, which can be the mask image $M(x, y)$, that also can be referred to as a mask or mask pattern. The mask image can be generated based at least in part on the 3-D object scene, in accordance with the one or more defined hologram generation criterion. The mask image can be a 2-D array of sample object points wherein each sample object point can have a certain degree of transparency ranging between 0 and 1. The DMPH generator component 106 can generate the mask image so that the size of the mask image, and the separation between the sample object points (e.g., the sampling pitch) can be identical, or at least substantially identical, to that of the grating (e.g., grating image). The DMPH generator component 106 can generate the mask image $M(x, y)$ to have it partitioned (e.g., evenly partitioned) into non-overlapping square blocks each with a desired size, such as, e.g., k×k pixels, wherein k can be an integer that can be larger than unity. For example, within each square block, the DMPH generator component 106 can set all of the pixels to an identical transparency between 0 and 1, wherein each square block can be taken as a pixel of the mask. As such, the resolution of the mask can be (1/k)th of that of grating image $G(x, y)$ along the horizontal and the vertical directions. That is, the pixel size of the mask can be k times larger than that of the grating along the horizontal and the vertical directions.

The DMPH generator component 106 can superposition the grating image and the mask image to facilitate generating a DMPH. For instance, the DMPH generator component 106 can superposition the grating image $G(x, y)$ and the mask image $M(x, y)$ to facilitate generating a DMPH $B(x, y)$ in accordance with Equation (1):

$$B(x,y)=G(x,y)M(x,y). \quad (1)$$

Figure 2:
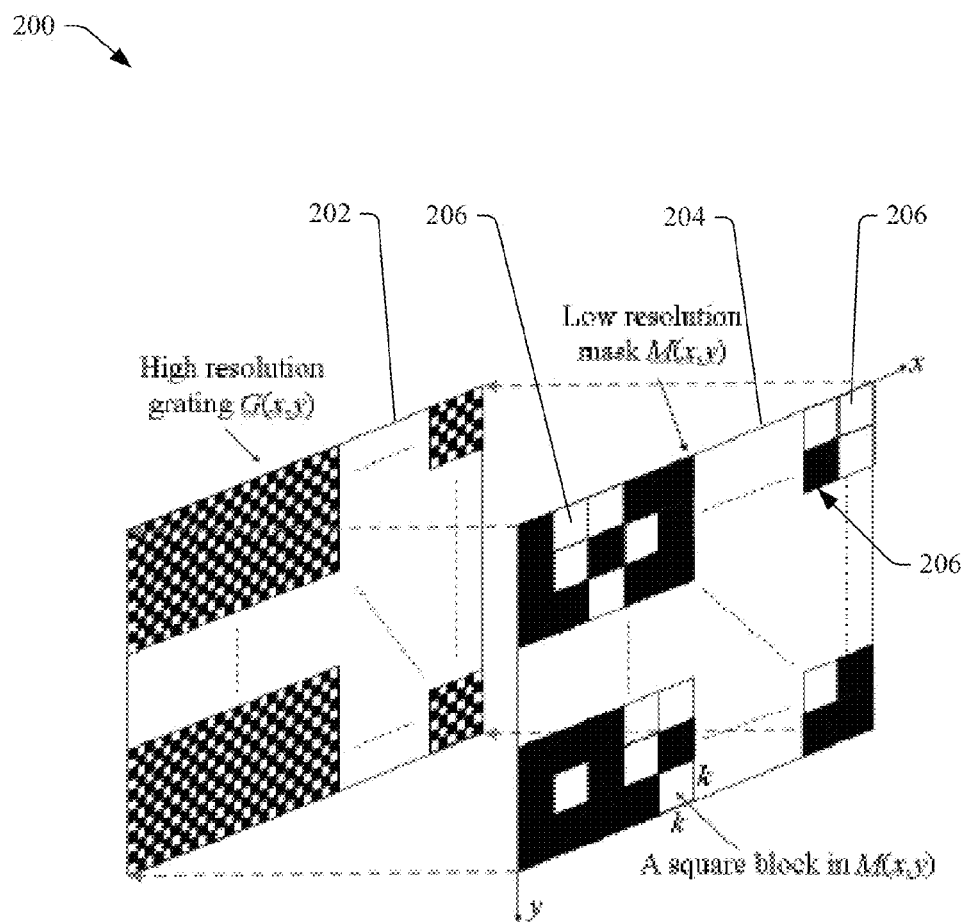
FIG. 2 depicts a diagram of an example digital mask programmable hologram (DMPH) in accordance with various aspects and implementations of the disclosed subject matter.

In some implementations, the DMPH generator component 106 can generate the mask image $M(x, y)$ to have each pixel in the mask image be binary (e.g., either transparent or opaque), wherein the mask image with such pixel property can be referred as a binary mask. Referring briefly to FIG. 2 (along with FIG. 1), FIG. 2 depicts a diagram of an example DMPH 200 in accordance with various aspects and implementations of the disclosed subject matter. The DMPH generator component 106 can generate the DMPH 200. The DMPH 200 can comprise a binary grating 202 ($G(x, y)$), which can be in the form of a checkerboard pattern. The binary grating 202 can be a high-resolution grating. The DMPH 200 also can include a binary mask 204 ($M(x, y)$), which can contain a pattern of square blocks 206. The binary mask 204 can be a low-resolution mask (e.g., can have a lower resolution than the resolution of the binary grating 202). The DMPH generator component 106 can generate the binary mask 204 to have it partitioned (e.g., evenly partitioned) into non-overlapping square blocks 206 that can each be a desired size, such as, e.g., k×k pixels, wherein k can be an integer that can be larger than unity. For example, within each square block 206, the DMPH generator component 106 can set all of the pixels to an identical transparency between 0 and 1, wherein each square block 206 can be taken as a pixel of the mask. As such, the resolution of the binary mask 204 can be (1/k)th of that of the binary grating 202 (e.g., grating image) along the horizontal and the vertical directions. The DMPH generator component 106 can overlay the binary mask 204 (e.g., mask pattern) onto the binary grating 202.

With further regard to FIG. 1, if the DMPH generator component 106 generates the DMPH as an on-axis hologram, the HGC 102 or display component 104 can illuminate the DMPH to generate a 3-D holographic image with an on-axis coherent beam to reconstruct the image (e.g., original 3-D image or scene) the DMPH represents. The magnitude of the reconstructed image (e.g., the 3-D holographic image) a distance $z_p$ can be expressed, for example, in accordance with Equation (2a) as $$I_d(x, y) = \left| \sum_{p=0}^{X} \sum_{q=0}^{Y} B(p, q) \exp\left( j \frac{2\pi}{\lambda} \sqrt{[(x - p)\delta d]^2 + [(y - q)\delta d]^2 + z_d^2} \right) \right|, \quad (2a)$$

where $j=\sqrt{-1}$, X and Y are the horizontal and vertical extents of the hologram, respectively, $\lambda$ is the wavelength of the optical beam, and $\delta d$ is the sampling pitch (e.g., the width, as well as the height of a sample object point) in B(x, y). Without loss of generality, it can be assumed that the hologram and the image scene can have identical horizontal and vertical extents.

If the DMPH generator component 106 generates the DMPH as an off-axis hologram, the HGC 102 or display component 104 can illuminate the DMPH to generate the corresponding 3-D holographic image with an off-axis coherent beam to reconstruct the image (e.g., original 3-D image or scene) the DMPH represents. The HGC 102 or display component 104 can generate the off-axis beam to have it inclined at an angle along certain direction that is not perpendicular to the hologram. If the off-axis beam is given by R(x, y), the reconstructed image (e.g., the 3-D holographic image) at a distance $z_p$ can be expressed, for example, in accordance with Equation (2b) as $$I_d(x, y) = \left| \sum_{p=0}^{X} \sum_{q=0}^{Y} B'(p, q) \exp\left( j \frac{2\pi}{\lambda} \sqrt{[(x - p)\delta d]^2 + [(y - q)\delta d]^2 + z_d^2} \right) \right|, \quad (2b)$$

where B'(x, y)=B(x, y)R(x, y).

From Equations (1) and (2a) or (2b), it can be inferred that the reconstructed image can be dependent on the mask pattern. However, given $I_d(x, y)$ there is no explicit inverse formulation to compute M(x, y). In accordance with various aspects of the disclosed subject matter, determination of the mask pattern M(x, y) to comply with a given target image $I_d(x, y)$ can be posed as an optimization process. As such, the DMPH generator component 106 can define an objective function $O_d$ to determine an error, such as, for example, the root mean square error (RMSE), between the reconstructed image $I_d(x, y)$ and a planar target image $T_d(x, y)$ that can be located at a distance $z_d$ from the hologram, as shown in Equation (3)

$$O_d = \sqrt{\frac{1}{XY} \sum_{p=0}^{X} \sum_{q=0}^{Y} [T_d(p, q) - I_d(p, q)]^2} \quad (3)$$

The DMPH generator component 106 can determine the mask pattern M(x, y) (e.g., mask image) such that the value of the objective function $O_d$ can be minimized or at least substantially minimized Determining the mask pattern can be a difficult problem, and it can be very difficult to try to determine the mask pattern using brute force means, such as a blind search, or other inefficient means. As an example, with regard to the aforementioned mask pattern, wherein the mask pattern can comprise binary pixels, with square blocks that can each be a desired size, such as, e.g., k×k pixels, and X and Y being the horizontal and vertical extents of the hologram, a total of $$2^{\left(\frac{XY}{k^2}\right)}$$

possible combinations can be represented in the mask pattern M(x, y). With a relatively modest square hologram with X and Y both equal to 256, and k=4, the total number of patterns that can be generated is $2^{4096}$.

In some implementations, the DMPH generator component 106 can determine or solve the optimization process, for example, as depicted in Equation (3), using a simple genetic algorithm (SGA), which is a process that can mimic the evolutionary mechanism in biological species. In other implementations, the DMPH generator component 106 can use other means for determining or solving the optimization process, wherein, for example, the means can include, but is not limited to, the Particle Swarm Optimization (PSO) or the Differential Evolution (DE). SGA, PSO, and DE are iterative processes for solving optimization problems. An example process using SGA to facilitate identifying a desirable (e.g., optimal or acceptable) mask pattern is more fully described herein.

PSO can optimize a problem by iteratively trying to improve a candidate solution with regard to a given measure of quality (e.g., a fitness measurement). Candidate solutions can be referred to as particles. PSO can optimize a problem by having a population of particles and moving these particles around in a search-space, in accordance with a formula or function, over the respective positions and velocities of the respective particles. For each particle, the movement of the particle can be guided by its best-known position and the best-known position of the swarm of particles in the search-space. As better positions for the particles are identified, the positions can be updated and the movements of particles in the swarm of particles can be further guided based on the updated positions of respective particles. This can result (but is not guaranteed to result) in movement of the swarm of particles toward the best or at least acceptable candidate solutions.

DE can optimize a problem by iteratively trying to improve a candidate solution with regard to a given measure of quality (e.g., a fitness measurement). DE can optimize a problem by maintaining a population of candidate solutions and creating new or updated candidate solutions by combining existing ones, in accordance with a formula or function. The DE can retain the candidate solution that has the best score or fitness in relation to the optimization problem.

Referring again to the SGA, the SGA can be effective in solving difficult optimization problems in many engineering applications. In accordance with the disclosed subject matter, the DMPH generator component 106 can utilize a type of SGA (or PSO, DE, etc.) to facilitate determining the mask pattern for optimizing (e.g., minimizing or at least substantially minimizing) the objective function $O_d$ (e.g., optimizing the objective function $O_d$ in Equation (3)).

Employing the SGA, the DMPH generator component 106 can convert the mask pattern M(x, y) into a one-dimensional (1-D) sequence of numbers by chaining consecutive rows of pixel values (each pixel value can correspond to the transparency of the pixel). In the context of SGA, the sequence can be referred as a chromosome and its structure can be depicted, for example, as:

M(0,0) M(0,k) M(0,2k)–M(0,Y/k–1) M(k,Y/k–1)–M(X/k–1,Y/k–1)

The chromosome can be interpreted as a 1-D array of data of length $N=XY/k^2$, and with the nth data ($0 \le n < XY/k^2$) that can be equal to M(floor(nk/Y),mod(nk,Y)), wherein floor(a) can be the largest integer that is not greater than a, and mod (a,b) can be the remainder of a/b.

The DMPH generator component 106 can evaluate a fitness measurement for the chromosome. The DMPH generator component 106 can determine (e.g., calculate) the fitness measurement as a function of the objective function $O_d$. For example, the fitness measurement (fitness) can be expressed as $$\text{fitness}=(1+O_d)^{-1}, \quad (4)$$

ranging from 0 to 1. In other implementations, the DMPH generator component 106 can utilize different mathematical expressions to determine or define the fitness measurement. For instance, the DMPH generator component 106 can determine or define the fitness measurement using any mathematical expression so long as that mathematical expression can correctly reflect the degree of similarity between the target image $T_d(x, y)$, and the reconstructed image $I_d(x, y)$ associated with the mask pattern M(x, y). A maximum fitness value of unity can reflect or indicate that $T_d(x, y)$ and $I_d(x, y)$ are identical. A minimum fitness value of zero can reflect or indicate that $T_d(x, y)$ and $I_d(x, y)$ are completely different.

The DMPH generator component 106 can perform a process for applying SGA to facilitate identifying or determining the desired (e.g., best achievable, optimal) mask pattern, in accordance with defined hologram generation criterion(s). The DMPH generator component 106 can generate a population comprising Q chromosomes. The DMPH generator component 106 also can set a generation count t to a defined initial value, such as 0. The DMPH generator component 106 can randomly assign each data in a chromosome a value between 1 and 0 with uniform or at least substantially uniform probability.

The DMPH generator component 106 can evaluate the fitness of all or at least a portion of the chromosomes in the population of chromosomes, for example, in accordance with a mathematical expression (e.g., Equation 4), in accordance with the disclosed subject matter. The DMPH generator component 106 also can select Q/2 pairs of parent chromosomes into a mating pool with probabilities that can be proportional to their fitness. The DMPH generator component 106 can adjust the generation count t to a next defined value. For example, the DMPH generator component 106 can increase the generation count t by 1.

The DMPH generator component 106 can generate or establish a new generation of population (also referred to as the child population) of chromosomes (e.g., Q chromosomes) by applying either one of the genetic operations, which can be the crossover operation or the mutation operation with respective probabilities $p_c$ and $p_m$, to each pair of parent chromosomes, respectively. For the crossover operation, the DMPH generator component 106 can exchange or mix each corresponding pair of data in the parent strings according to certain defined rules, in accordance with the defined hologram generation criterion(s). For example, one of the defined rules can be to have the DMPH generator component 106 swap the pair of data with a probability $q_c$. Regarding mutation, the DMPH generator component 106 can select (e.g., randomly select) the data in the parent chromosomes with a probability $q_m$, and the DMPH generator component 106 can change the value of each of the selected data to a random value.

The DMPH generator component 106 can evaluate the fitness of all or at least a portion of the respective chromosomes of all in the new population of chromosomes, for example, in accordance with a mathematical expression (e.g., Equation 4), in accordance with the disclosed subject matter. In the progression from the parent population to the child population, the DMPH generator component 106 can preserve and select the best chromosome with the highest fitness value, known as the elite, to replace the weakest candidate in the new population of chromosomes. For instance, the DMPH generator component 106 can apply the elite principle or rule by identifying the weakest individual chromosome in the child population of chromosomes and replacing it with the strongest chromosome in the previous (e.g., parent) generation of chromosomes. The DMPH generator component 106 can continue to perform this evolution process of iteratively generating a new population of chromosomes from the previous generation of chromosomes until the fitness value exceeds a defined minimum threshold fitness value or the defined maximum allowable number of generations has elapsed.

For instance, in relation to each generation of a new population of chromosomes (e.g., after selecting Q/2 pairs of parents into the mating pool), the DMPH generator component 106 can increase the generation count t. After continuing to perform the optimization process during the iteration to apply the elite principle to replace the weakest individual chromosome in the child population with the strongest chromosome of the previous generation, as described herein, if the DMPH generator component determines the generation count t has reached the defined maximum threshold allowable number of generations, it can determine that the defined maximum threshold allowable number of generations has elapsed. If the defined maximum threshold allowable number of generations has elapsed or the fitness value exceeds the defined minimum threshold fitness value, the DMPH generator component 106 can discontinue the process, and the DMPH generator component 106 can select the last result as a suitable result that can be used to identify a suitable mask pattern, wherein the last result can be the optimal (e.g., best achievable) result for the objective function $O_d$, based at least in part on the defined hologram generation criterion(s). The defined hologram generation criterion(s) can relate to or specify, for example, the defined minimum threshold fitness value and/or a maximum number of iterations to perform, which can correspond to the defined maximum threshold allowable number of generations.

With the hologram generated, the HGC 102 can provide (e.g., communicate) the 3-D hologram (e.g., 3-D DMPH), in real time or via recorded media (e.g., 2-D media, such as film), to the display component 104. The display component 104 can generate, reconstruct, or reproduce 3-D holographic images (e.g., full-parallax 3-D Fresnel holographic images) that can represent or recreate the original 3-D object scene, based at least in part on the 3-D hologram, and can present (e.g., display) the 3-D holographic images for viewing by one or more viewers from various visual perspectives. In some implementations, the HGC 102 and the display component can operate in conjunction with each other to facilitate generating, reconstructing, or reproducing the 3-D holographic images that can represent or recreate the original 3-D object scene, based at least in part on the 3-D hologram, for presentation, by the display component 104.

The display component 104 can include one or more display units (e.g., one or more electronically accessible display units, wherein each pixel of a display unit(s) can be electronically accessible). In some implementations, each display unit can be a low-resolution display device, such as a low-resolution LCD or low-resolution SLM. For example, each display unit can have a dot-pitch that can be at least one order of magnitude higher than the wavelength of visible light. In other implementations, the display component 104 can comprise one or more of LCoS displays, high-resolution LCDs, autostereoscopic displays (e.g., multiple-section autostereoscopic displays (MSADs)), holographic 3-D television (TV) displays, high-resolution SLMs, or other desired displays suitable for displaying holographic images (e.g., 3-D Fresnel holographic images), to facilitate display (e.g., real time display) of holographic images.

In some implementations, the display component 104 can include a display unit that can include real binary display unit that can display each pixel as being either transparent or opaque. In other implementations, the display component 104 can include multiple display units (e.g., a pair of display units), which can be binary display units, wherein one display unit can display the real part of the hologram and the other display unit can display the imaginary part of the hologram. The display component 104 can combine the pair of binary display units using optical means, and each pixel can be either transparent or opaque.

In still other implementations, the display component 104 can include a single, discrete multi-level display unit that can display each pixel respectively having a transparency level from a set of allowable transparency levels, with the set of allowable transparency levels comprising respective transparency levels ranging from transparent to opaque. In other implementations, the display component 104 can comprise multiple (e.g., a pair) of discrete, multi-level display units, wherein one display unit can display the real part of the hologram and another display unit can display the imaginary part of the hologram, and each pixel can have a respective transparency level from the set of allowable transparency levels.

Additionally and/or alternatively, if desired, a hologram can be produced onto a desired material (e.g., onto film using photographic techniques) so that there is a hard copy of the hologram that can be used to reproduce the 3-D holographic images at a desired time. In some implementations, the HGC 102 can generate the digital hologram using a single static media, such as a photographic film or a printout, and the display component 104 can display the hologram, wherein the static media can display the real part of the hologram. In other implementations, the HGC 102 can generate the digital hologram using a multiple (e.g., a pair) of static media (e.g., photographic film or printouts), and the display component 104 can display the hologram, wherein one static media can display the real part of the hologram and another static media can display the imaginary part of the hologram.

It is to be appreciated and understood that the holographic output (e.g., 3-D hologram and/or corresponding 3-D holographic images) can be communicated over wired or wireless communication channels to the display component 110 or other display components (e.g., remote display components, such as a 3-D TV display) to facilitate generation (e.g., reconstruction, reproduction) and display of the 3-D holographic images of the 3-D object scene) so that the 3-D holographic images can be presented to desired observers.

The system 100 and/or other systems, methods, devices, processes, techniques, etc., of the disclosed subject matter can be employed in any of a number of different applications. Such applications can include, for example, a 3-D holographic video system, desktop ornaments, attractions in theme parks, educational applications or purposes, a holographic studio, scientific research, live stage or concerts, etc.

Figure 3:
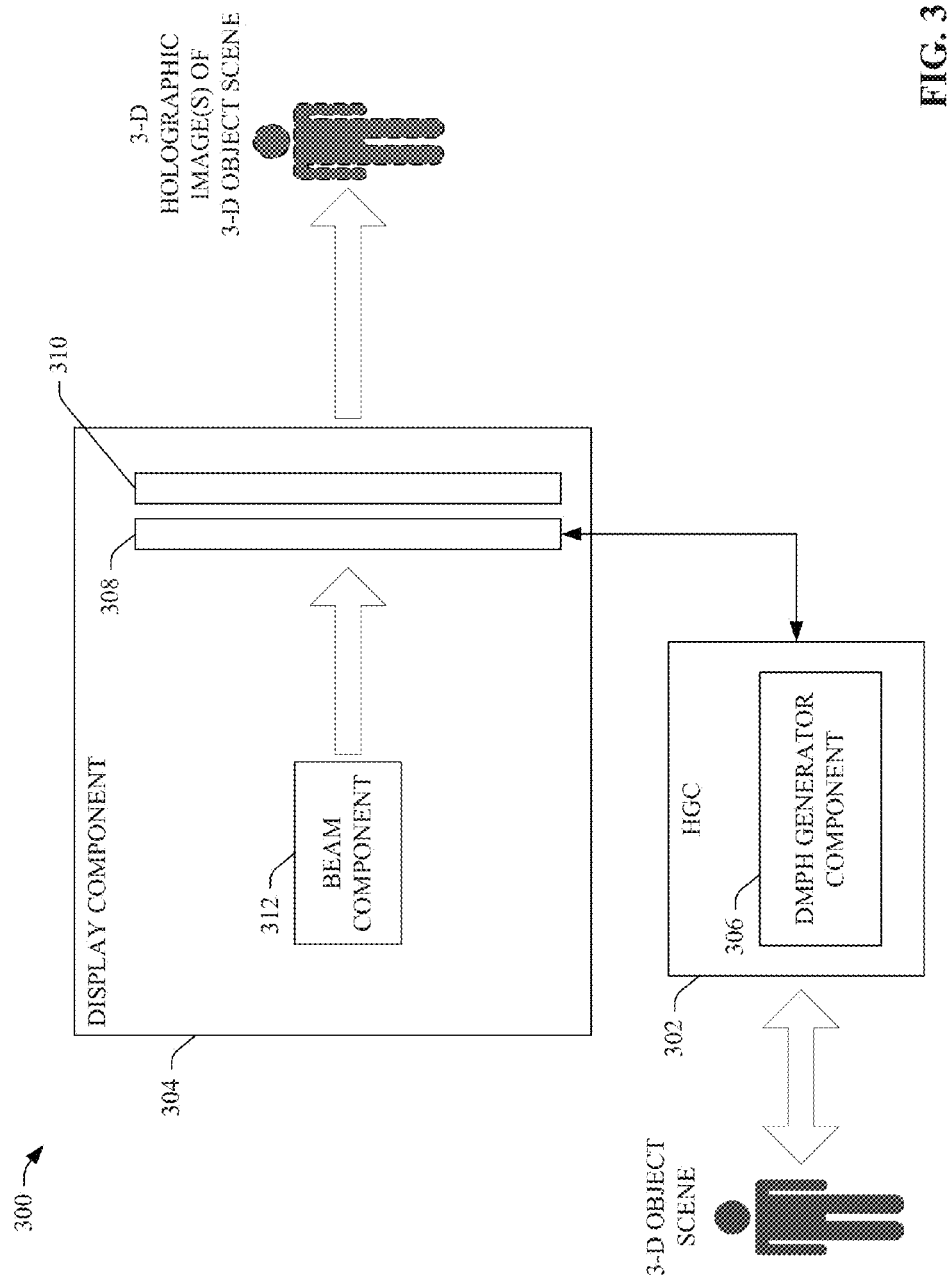
FIG. 3 illustrates a system for generating and displaying holograms, in accordance with various aspects and implementations of the disclosed subject matter.

FIG. 3 depicts a system 300 for generating and displaying holograms (e.g., full-parallax 3-D Fresnel holograms), in accordance with various aspects and implementations of the disclosed subject matter. The system 300 can include an HGC 302 that can generate digital 3-D holograms, which can be DMPHs, based at least in part on a real or synthetic (e.g., simulated) 3-D object scene. The system 300 also can include a display component 304 can be associated with (e.g., communicatively connected to) the HGC 302. The HGC 302 can provide the 3-D holograms (e.g., DMPHs) to the display component 304. The display component 304 can generate, reconstruct, or reproduce 3-D holographic images (e.g., full-parallax 3-D Fresnel holographic images) that can represent or recreate the original 3-D object scene, based at least in part on the 3-D hologram, and can present (e.g., display) the 3-D holographic images for viewing by one or more viewers from various visual perspectives. The HGC 302 can include a DMPH generator component 306 that can generate DMPHs for use in generating, reconstructing, or reproducing the 3-D holographic images. The HGC 302, display component 304, and DMPH generator component 306, respectively, can be the same as or similar to, or can comprise the same or similar features as, respectively named components, as more fully disclosed herein.

The display component 304 can include one or more display units 308 that can be employed to facilitate presenting the 3-D holographic images. In some implementations, the one or more display units 308 can be a low-resolution display, such as an LCD. The display component 304 also can include one or more high-resolution gratings 310 that can be applied, attached, overlaid, or placed in proximity to the one of more display units 308 (e.g., the display screens of the one or more display units 308). In some implementations, the one or more high-resolution gratings 310 can be arranged in relation to the one or more display units 308 such that an illumination beam can be applied (e.g., directly) to the one or more display units 308. The dot-pitch of the one or more high-resolution gratings 310 can be on one scale (e.g., nano-scale), while the one or more display units 308 can be on a different scale or order that can be significantly lower than the scale of the one or more high-resolution gratings 310. For example, each display unit 308 can have a dot-pitch that can be at least one order of magnitude higher than the wavelength of visible light.

The display component 304 also can include a beam component 312 that can generate and apply an illumination beam at a desired angle to the one or more display units 308 to facilitate producing the 3-D holographic images. In response to the illumination beam being applied to the one or more display units 308, with the one or more high-resolution gratings 310 associated therewith, the 3-D holographic images representing the original 3-D object scene can be generated as an output from the one or more high-resolution gratings 310 and presented for viewing. The resolution of the reconstructed 3-D holographic images can be governed or controlled by the low-resolution display unit(s) 308, while the diffraction efficiency (e.g., quality) of the reconstructed 3-D holographic images can be governed or controlled by the high-resolution grating(s) 310.

Figure 4:
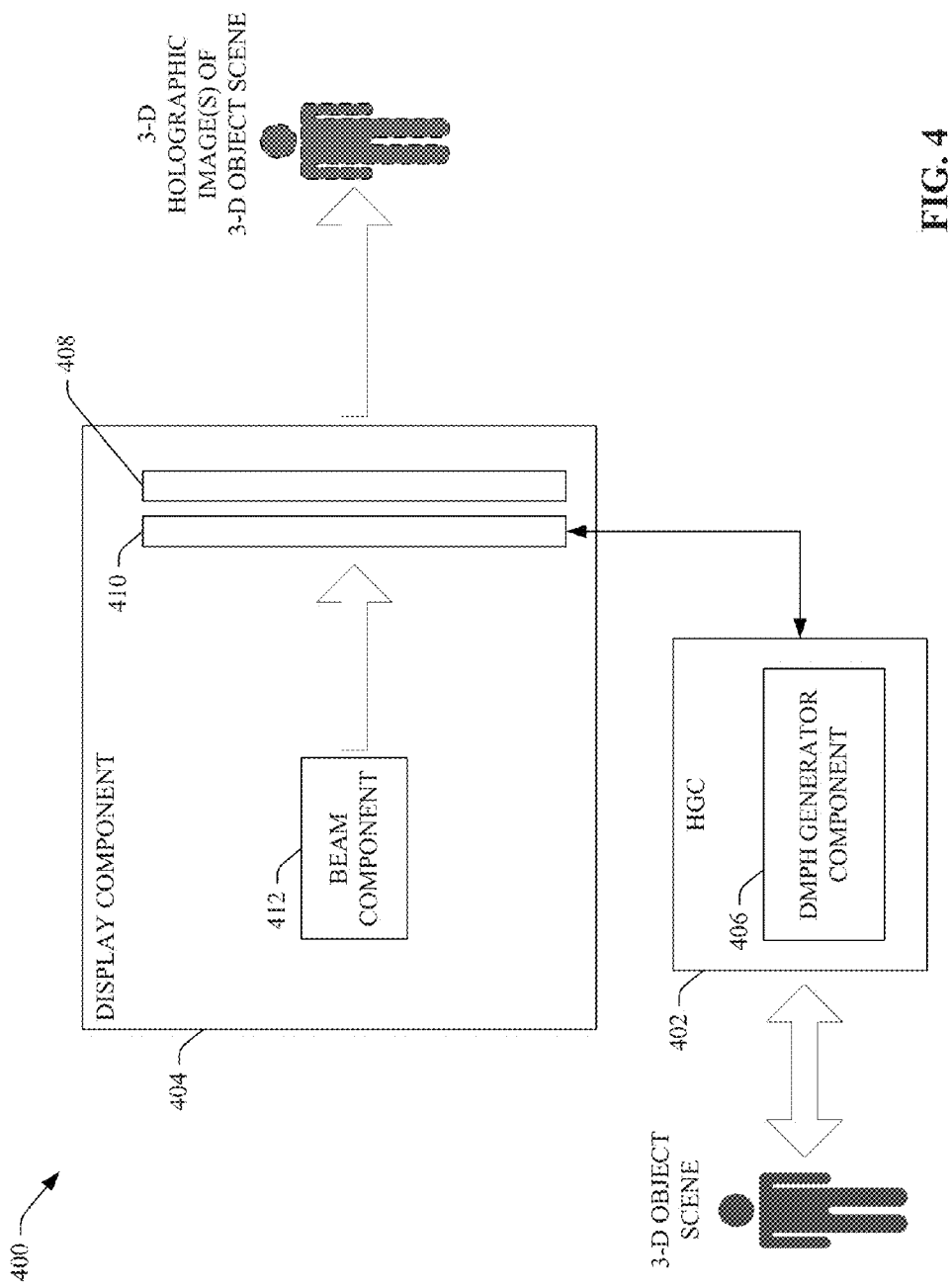
FIG. 4 illustrates another system for generating and displaying holograms, in accordance with various aspects and implementations of the disclosed subject matter.

FIG. 4 illustrates another system 400 for generating and displaying holograms (e.g., full-parallax 3-D Fresnel holograms), in accordance with various aspects and implementations of the disclosed subject matter. The system 400 can include an HGC 402 that can generate digital 3-D holograms, which can be DMPHs, based at least in part on a real or synthetic (e.g., simulated) 3-D object scene. The system 400 also can include a display component 404 can be associated with (e.g., communicatively connected to) the HGC 402. The HGC 402 can provide the 3-D holograms (e.g., DMPHs) to the display component 404. The display component 404 can generate, reconstruct, or reproduce 3-D holographic images (e.g., full-parallax 3-D Fresnel holographic images) that can represent or recreate the original 3-D object scene, based at least in part on the 3-D hologram, and can present (e.g., display) the 3-D holographic images for viewing by one or more viewers from various visual perspectives. The HGC 402 can include a DMPH generator component 406 that can generate DMPHs for use in generating, reconstructing, or reproducing the 3-D holographic images. The display component 404 can comprise one or more low-resolution display units 408 (e.g., LCDs), one or more high-resolution gratings 410, and a beam component 412. The HGC 402, display component 404, DMPH generator component 406, one or more display units 408, one or more high-resolution gratings 410, and beam component 412, respectively, can be the same as or similar to, or can comprise the same or similar features as, respectively named components, as more fully disclosed herein.

The one or more high-resolution gratings 410 can be applied, attached, overlaid, or placed in proximity to the one of more display units 408 (e.g., the display screens of the one or more display units 408). In some implementations, the one or more high-resolution gratings 410 can be arranged in relation to the one or more display units 408 such that an illumination beam can be applied (e.g., directly) to the one or more high-resolution gratings 410. The dot-pitch of the one or more high-resolution gratings 410 can be on one scale (e.g., nanoscale), while the one or more display units 408 can be on a different scale or order that can be significantly lower than the scale of the one or more high-resolution gratings 410. For example, each display unit 408 can have a dot-pitch that can be at least one order of magnitude higher than the wavelength of visible light.

The beam component 412 can generate and apply an illumination beam at a desired angle to the one or more high-resolution gratings 410 to facilitate producing the 3-D holographic images. In response to the illumination beam being applied to the one or more high-resolution gratings 410, with the one or more display units 408 associated therewith, the 3-D holographic images representing the original 3-D object scene can be generated as an output from the one or more display units 408 and presented for viewing. The resolution of the reconstructed 3-D holographic images can be governed or controlled by the low-resolution display unit(s) 408, while the diffraction efficiency (e.g., quality) of the reconstructed 3-D holographic images can be governed or controlled by the high-resolution grating(s) 410.

Figure 5:
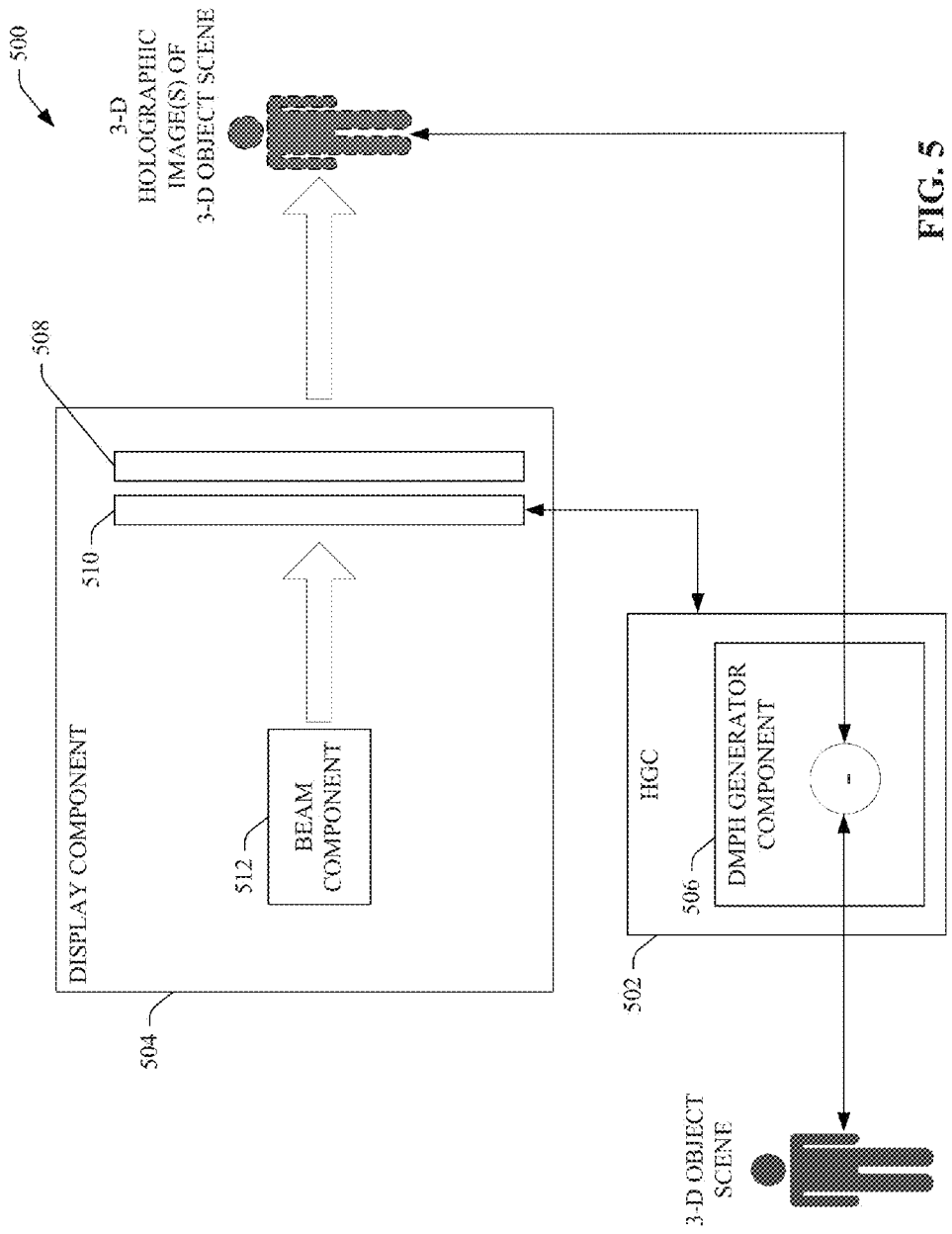
FIG. 5 depicts still another system for generating and displaying holograms, in accordance with various aspects and implementations of the disclosed subject matter.

FIG. 5 depicts still another system 500 for generating and displaying holograms (e.g., full-parallax 3-D Fresnel holograms), in accordance with various aspects and implementations of the disclosed subject matter. The system 500 can include an HGC 502 that can generate digital 3-D holograms, which can be DMPHs, based at least in part on a real or synthetic (e.g., simulated) 3-D object scene. The system 500 also can include a display component 504 can be associated with (e.g., communicatively connected to) the HGC 502. The HGC 502 can provide the 3-D holograms (e.g., DMPHs) to the display component 504. The display component 504 can generate, reconstruct, or reproduce 3-D holographic images (e.g., full-parallax 3-D Fresnel holographic images) that can represent or recreate the original 3-D object scene, based at least in part on the 3-D hologram, and can present (e.g., display) the 3-D holographic images for viewing by one or more viewers from various visual perspectives. The HGC 502 can include a DMPH generator component 506 that can generate DMPHs for use in generating, reconstructing, or reproducing the 3-D holographic images. The display component 504 can comprise one or more low-resolution display units 508 (e.g., LCDs), one or more high-resolution gratings 510, and a beam component 512. The HGC 502, display component 504, DMPH generator component 506, one or more display units 508, one or more high-resolution gratings 510, and beam component 512, respectively, can be the same as or similar to, or can comprise the same or similar features as, respectively named components, as more fully disclosed herein.

The one or more high-resolution gratings 510 can be applied, attached, overlaid, or placed in proximity to the one of more display units 508 (e.g., the display screens of the one or more display units 508). In some implementations, the one or more high-resolution gratings 510 can be arranged in relation to the one or more display units 508 such that an illumination beam can be applied (e.g., directly) to the one or more high-resolution gratings 410.

The beam component 512 can generate and apply an illumination beam at a desired angle to the one or more high-resolution gratings 510 to facilitate producing the 3-D holographic images. In response to the illumination beam being applied to the one or more high-resolution gratings 510, with the one or more display units 508 associated therewith, the 3-D holographic images representing the original 3-D object scene can be generated as an output from the one or more display units 508 and presented for viewing. In some implementations, the system 500 can include a feedback loop, wherein the 3-D holographic images can be fed back, and the DMPH generator component 506 can compare or combine the fed back 3-D holographic images with the 3-D object scene to facilitate generating 3-D holograms (e.g., DMPHs) and producing 3-D holographic images representing the original 3-D object scene. The DMPH generator component 506 can identify an error, if any, in the fed-back reconstructed 3-D holographic images in relation to (e.g., as compared to) the original 3-D object scene. The DMPH generator component 506 can modify the mask (e.g., generate a new modified mask or adjust the mask), based at least in part on the identified error, to reduce or minimize the error (e.g., to compensate for the identified error). The 3-D holographic image(s), which can be fed back, can include, for example, the numerical image(s) (e.g., reconstructed image(s) computed as an image file(s)) or an optically reconstructed image(s) (e.g., a reconstructed image(s) displayed by the display component). The resolution of the reconstructed 3-D holographic images can be governed or controlled by the low-resolution display unit(s) 508, while the diffraction efficiency (e.g., quality) of the reconstructed 3-D holographic images can be governed or controlled by the high-resolution grating(s) 510.

Figure 6:
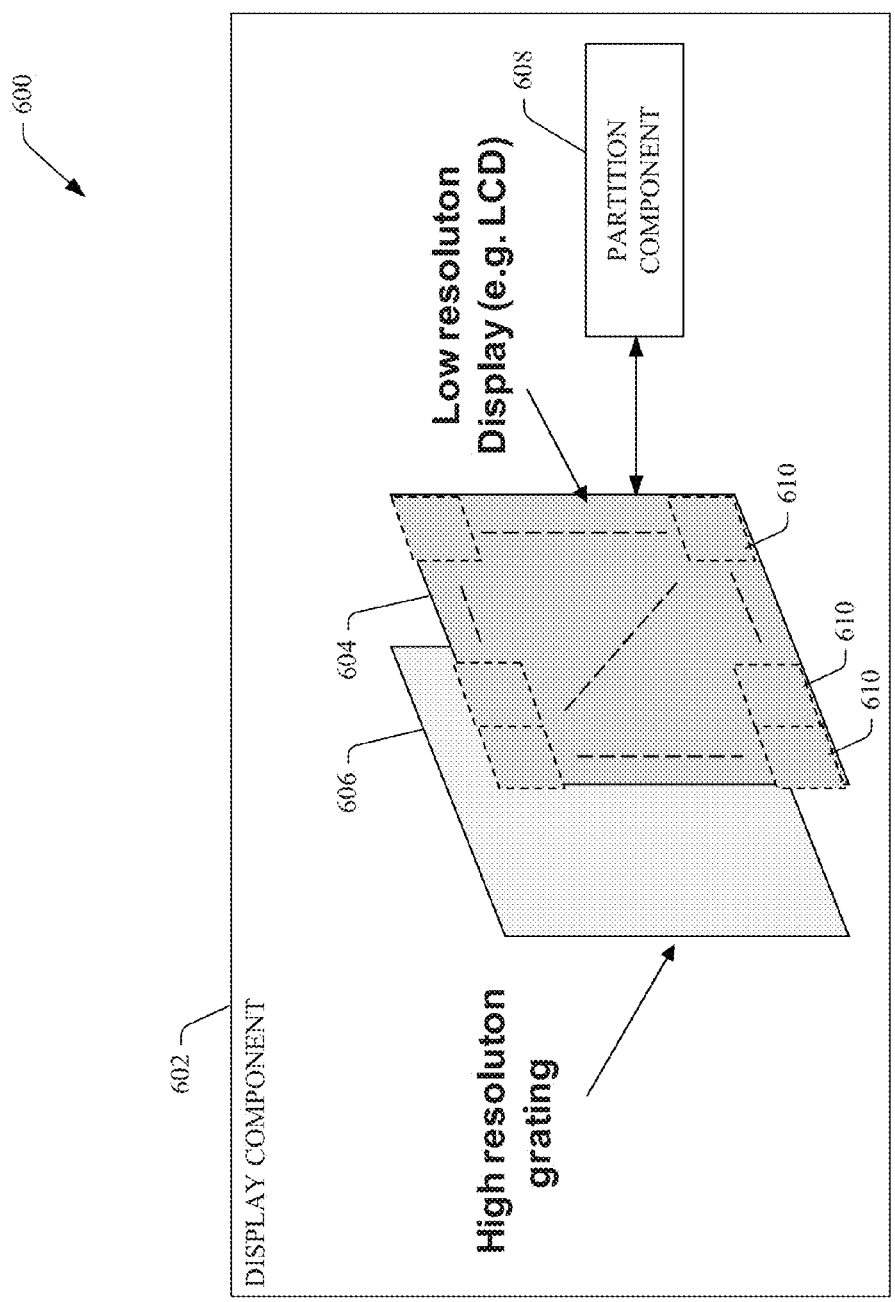
FIG. 6 illustrates a system for displaying holograms, in accordance with various aspects and implementations of the disclosed subject matter.

FIG. 6 illustrates a system 600 for displaying holograms (e.g., full-parallax 3-D Fresnel holograms), in accordance with various aspects and implementations of the disclosed subject matter. The system 600 can include a display component 602 that can reconstruct and display 3-D holographic images, based at least in part on a received 3-D hologram (e.g., DMPH). The display component 602 can include a low-resolution display 604 (e.g., display unit), such as, for example, an LCD. The display component 602 also can include a high-resolution grating 606 that can be applied, attached, overlaid, or placed in proximity to the display 604. The display component 602 also can comprise a partition component 608 that can partition (e.g., logically partition) the single display 604 into a 2-D tile structure comprising a plurality of tiles 610. The HGC (e.g., 102), using the DMPH generator component (e.g., 106), can generate a hologram (e.g., based on a 3-D object scene) for each tile, wherein each tile can correspond to a given reconstructed holographic image.

Figure 7:
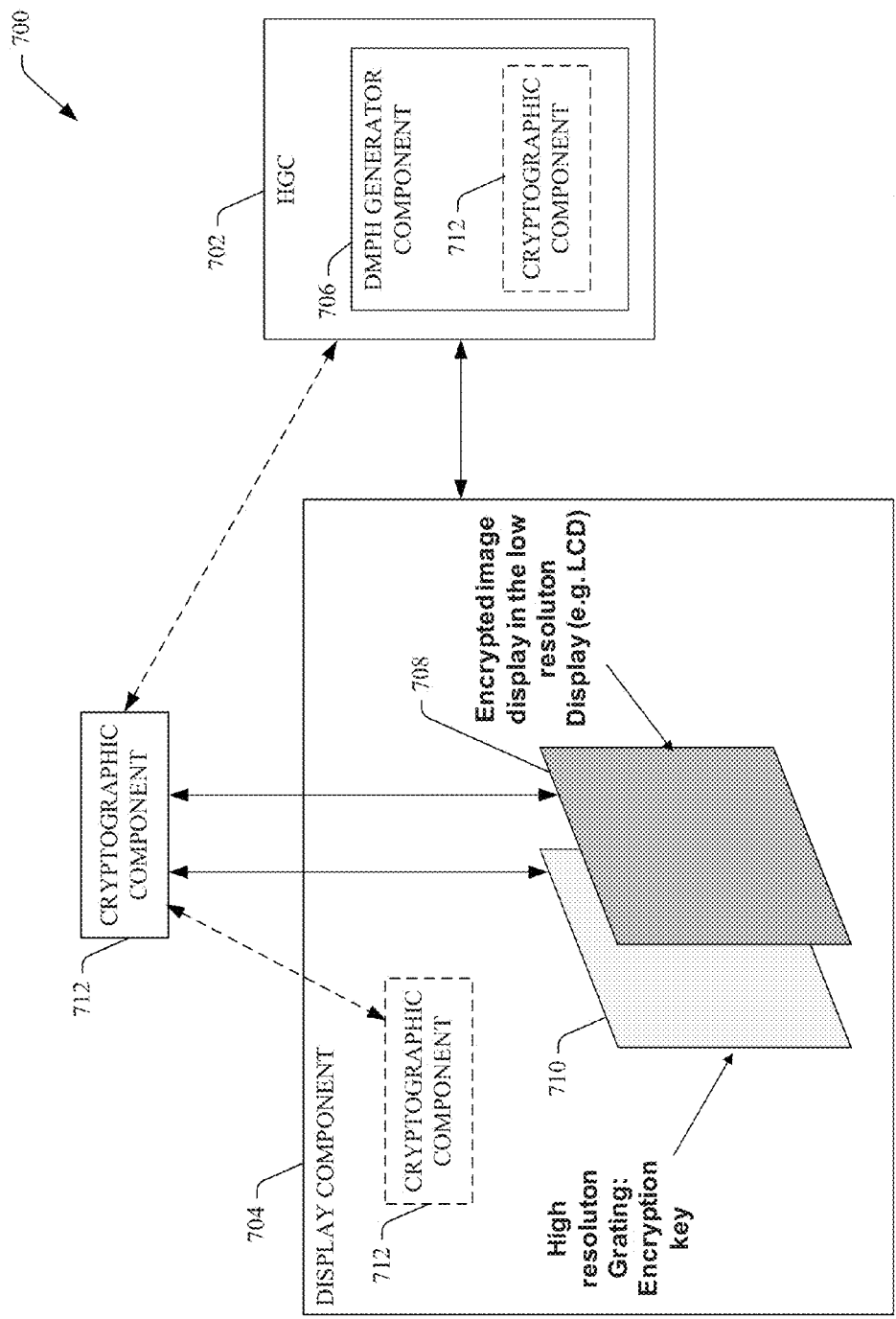
FIG. 7 depicts a system for encrypting holographic data and displaying holograms, in accordance with various aspects and implementations of the disclosed subject matter.

FIG. 7 depicts a system 700 for encrypting holographic data and displaying holograms (e.g., full-parallax 3-D Fresnel holograms), in accordance with various aspects and implementations of the disclosed subject matter. The system 700 can include an HGC 702 that can generate digital 3-D holograms, which can be DMPHs, based at least in part on a real or synthetic (e.g., simulated) 3-D object scene. The system 700 also can include a display component 704 that can be associated with (e.g., communicatively connected to) the HGC 702. The HGC 702 can provide the 3-D holograms (e.g., DMPHs) to the display component 704.

The display component 704 can generate, reconstruct, or reproduce 3-D holographic images (e.g., full-parallax 3-D Fresnel holographic images) that can represent or recreate the original 3-D object scene, based at least in part on the 3-D hologram, and can present (e.g., display) the 3-D holographic images for viewing by one or more viewers from various visual perspectives. The HGC 702 can include a DMPH generator component 706 that can generate DMPHs for use in generating, reconstructing, or reproducing the 3-D holographic images. The display component 704 can include a low-resolution display 708 (e.g., display unit), such as, for example, an LCD. The display component 704 also can include a high-resolution grating 710 that can be applied, attached, overlaid, or placed in proximity to the display 708.

The display component 704 and/or the DMPH generator component 706 can comprise a cryptographic component 712 that can encrypt holographic data associated with the hologram, in accordance with a defined cryptographic algorithm or process, to facilitate encrypting the hologram. The encrypting of the holographic data can obscure the correct reconstruction of the holographic image unless an encryption key is employed to decrypt the encrypted holographic data. The display component 704 or the DMPH generator component 706 can configure the high-resolution grating 710 to be the encryption key, in accordance with the defined cryptographic algorithm or process. If the display 708 directly receives the illumination beam, the display 708 can output an encrypted holographic image, based at least in part on the hologram. The encrypted holographic image can be input into the high-resolution grating 710, and the high-resolution grating 710, comprising the encryption key (which can correspond to the key of the encrypted holographic image), can decrypt the encrypted holographic image to produce the correct reconstructed holographic image, which can be presented for viewing.

Figure 8:
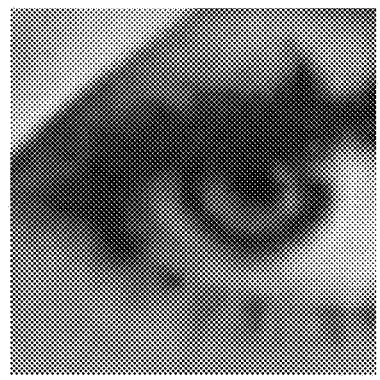
FIG. 8 illustrates a diagram of an example image (e.g., target image).

Experimental results demonstrate that the disclosed subject matter, by employing the HGC (e.g., 102) and generating DMPHs, can generate holographic images that can be superior to holographic images generated using the classical Fresnel diffraction equation and displayed on a low-resolution SLM. Referring briefly to FIG. 8 (along with FIG. 1), FIG. 8 illustrates a diagram of an example image 800 (e.g., target image). The image 800 can be an image, wherein it can be desired that a reconstructed image (e.g., holographic image) ideally will correspond to the image 800 when the reconstructed image is generated and displayed on a low-resolution SLM. The image 800 is a planar image placed at 0.4 meters from the hologram.

The first example illustrates how a reconstructed image of a digital Fresnel hologram appears, if it is displayed on a low-resolution SLM. To conduct this evaluation, a complex, continuous tone digital hologram representing the planar image 800 shown in FIG. 8 is generated based on the classical Fresnel diffraction equation, and with the optical setting listed in Table I. The hologram is composed of a 2-D array of sample object points, with a sampling pitch of 5 μm.

TABLE I

Optical setting of the Fresnel hologram

| | |
|---|---|
| Number of hologram samples | 256 (horizontal) × 256 (vertical) |
| Sampling pitch | 5 μm |
| Wavelength of light | 650 nm |
| Distance of image from hologram | 0.4 m |

Figure 9:
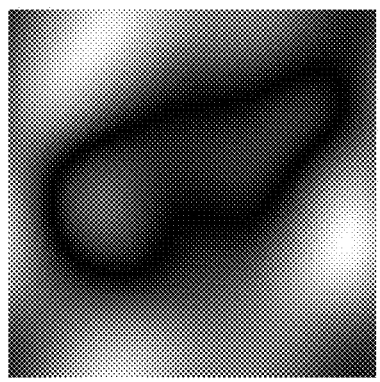
FIG. 9 depicts the simulated numerical reconstructed image of a conventional hologram displayed on a low-resolution spatial light modulator (SLM).

Turning briefly to FIG. 9 (along with FIG. 1), FIG. 9 depicts the simulated numerical reconstructed image 900 of a conventional hologram displayed on an SLM with pixel sizes of 20 μm at 0.4 meters. It can be seen that the quality of the reconstructed image 900 in FIG. 9 is very poor as compared with the target image 800 in FIG. 8.

Figure 10:
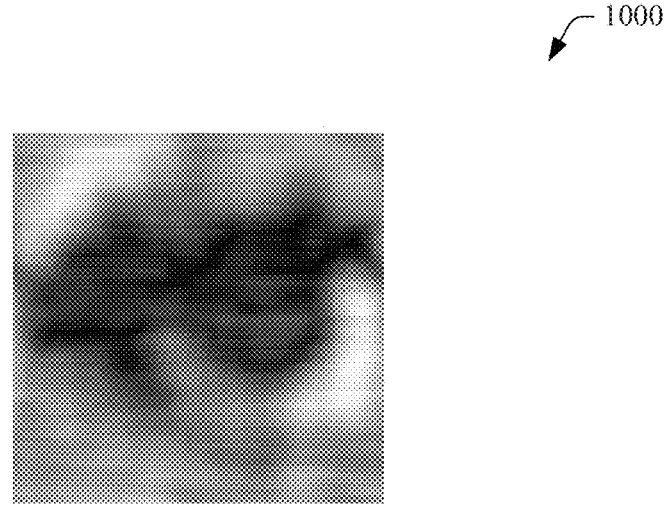
FIG. 10 presents an example reconstructed image of a DMPH, in accordance with various aspects and implementations of the disclosed subject matter.

Referring briefly to FIG. 10 (along with FIG. 1), FIG. 10 presents an example reconstructed image 1000 of a DMPH, in accordance with various aspects and implementations of the disclosed subject matter. The disclosed subject matter (e.g., using the HGC 102) can generate a DMPH for representing the target image 800 in FIG. 8 based on the parameter settings in Table II. The disclosed subject matter utilizes a binary grating and a binary mask in this example generation of a DMPH and display of the reconstructed image 1000 of the DMPH. It is noted that the pixel size of the binary mask is at 20 μm, which is 4 times larger than that of the binary grating (e.g., k=4).

TABLE II

Optical setting of the DMPH

| | | |
|---|---|---|
| Size of the grating | 256 × 256 | pixels |
| Pixel size of the binary grating | 5 | μm square |
| Size of the binary mask | 64 × 64 | pixels |
| Pixel size of the binary mask | 20 | μm square |
| Wavelength of light | 650 | nm |
| Distance of image from hologram | 0.4 | m |

The disclosed subject matter (e.g., using the HGC 102) generates a DMPH after applying the SGA described herein with the defined maximum allowable number of generations set to 20000 generations. The disclosed subject matter sets the population size Q to 16, the parameter $p_c$ to 0.85, the parameter $p_m$ to 0.15, the parameter $q_c$ to 0.001, and the parameter $q_m$ to 0.3. These respective values are selected empirically to provide satisfactory performance in general.

Figure 11:
FIG. 11 illustrates an example binary mask that is used as part of the DMPH to facilitate generating a reconstructed image (e.g., holographic image), in accordance with aspects and implementations of the disclosed subject matter.

Turning briefly to FIG. 11 (along with FIGS. 1 and 10), FIG. 11 illustrates an example binary mask 1100 that is used as part of the DMPH to facilitate generating a reconstructed image (e.g., holographic image), in accordance with aspects and implementations of the disclosed subject matter. The disclosed subject matter (e.g., the HGC 102) is used to generate the binary mask 1100. The binary mask 1100 corresponds to the target image (e.g., image 800).

The disclosed subject matter (e.g., using the HGC 102) is used to generate the reconstructed image 1000 using the binary mask 1100. The reconstructed image 1000 of the DMPH is at a focal distance of 0.4 meters from the hologram. As can be seen, the reconstructed image 1000 of the DMPH is similar to the target image 800, and is superior to the reconstructed image 900 obtained with a low-resolution SLM.

Figure 12:
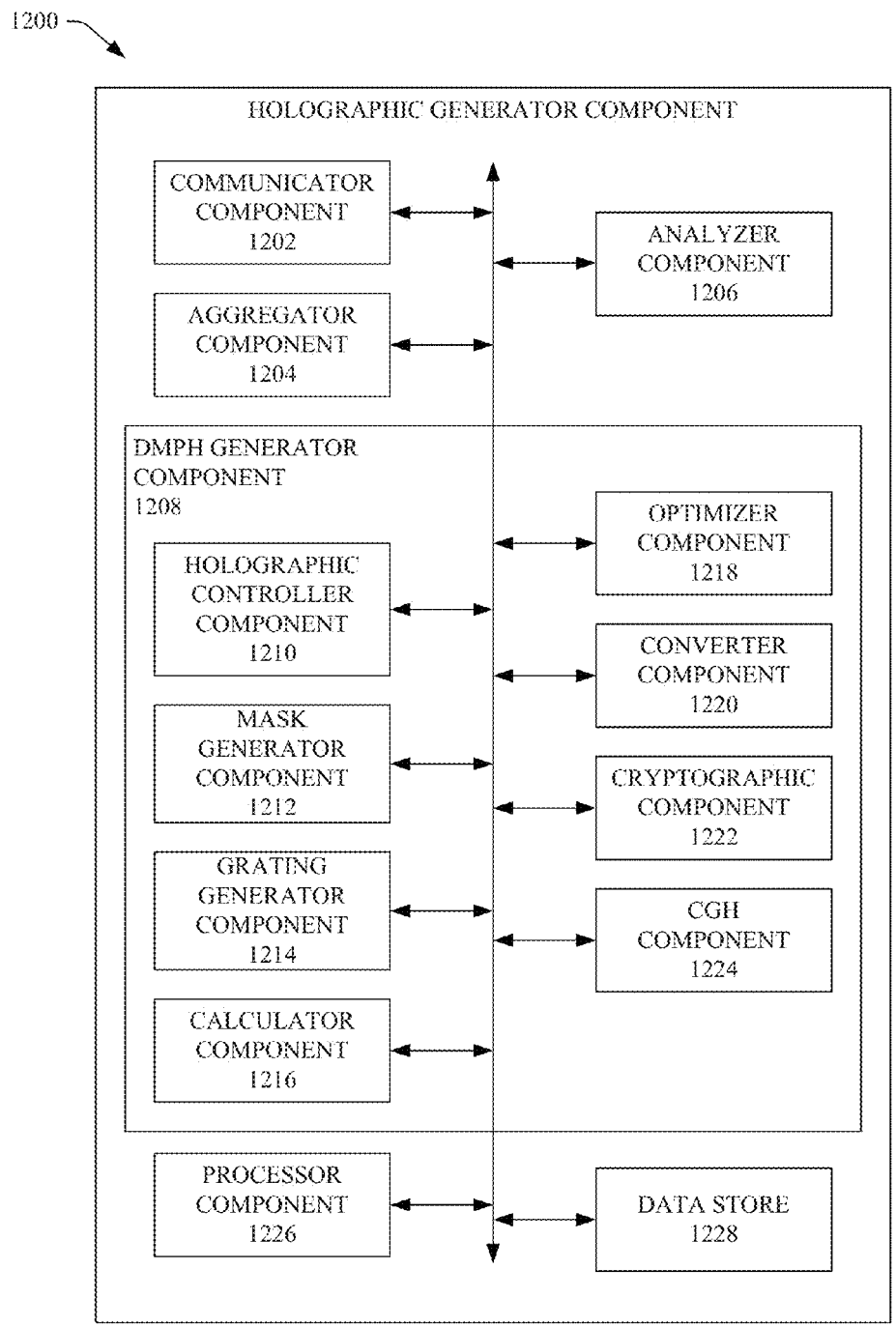
FIG. 12 illustrates a block diagram of an example holographic generator component (HGC) that can efficiently generate a 3-D hologram(s) of a real or synthetic 3-D object scene(s) in accordance with various aspects and implementations of the disclosed subject matter.

FIG. 12 illustrates a block diagram of an example HGC 1200 that can efficiently generate a 3-D hologram(s) (e.g., 3-D Fresnel hologram(s)) of a real or synthetic 3-D object scene(s) in accordance with various aspects and implementations of the disclosed subject matter. The HGC 1200 can include a communicator component 1202 that can be used to communicate (e.g., transmit, receive) information between the HGC 1200 and other components (e.g., display component(s), scene capture device(s), processor component(s), user interface(s), data store(s), etc.). The information can include, for example, a real or synthetic 3-D object scene, holograms or holographic images, information relating defined hologram generation criterion(s), information relation to an algorithm(s) that can facilitate generation of holograms or holographic images, etc.

The HGC 1200 can comprise an aggregator component 1204 that can aggregate data received (e.g., obtained) from various entities (e.g., scene capture device(s), display component(s), processor component(s), user interface(s), data store(s), etc.). The aggregator component 1204 can correlate respective items of data based at least in part on type of data, source of the data, time or date the data was generated or received, object point with which data is associated, pixel with which a transparency level is associated, visual perspective with which data is associated, etc., to facilitate processing of the data (e.g., analyzing of the data by the analyzer component 1206).

The analyzer component 1206 can analyze data to facilitate identifying elements (e.g., object points, features, etc.) of a 3-D object scene, identifying an objective function $O_d$, determining the mask pattern for optimizing the objective function, generating a hologram (e.g., DMPH), etc., and can generate analysis results, based at least in part on the data analysis. For example, the analyzer component 1206 can analyze data, such as a population(s) (e.g., parent or child population(s)) of chromosomes (e.g., 1-D sequence of numbers based at least in part on a mask pattern M(x,y)), to facilitate evaluating the fitness of the respective chromosomes. The analyzer component 1206 can provide analysis results relating to, for example, a DMPH generator component 1208 or another component (e.g., processor component 1226, data store 1228, etc.). Based at least in part on the results of this analysis, the HGC 1200 (e.g., using the DMPH generator component 1208) can determine or identify an optimal (e.g., best achievable in accordance with the defined hologram generation criterion(s)) result for the objective function $O_d$.

The HGC 1200 can include the DMPH generator component 1208 that can generate a full-parallax digital 3-D hologram (e.g., Fresnel hologram) to facilitate generating or reconstructing full-parallax digital 3-D holographic images (e.g., Fresnel holographic images) that can represent or recreate the original real or synthetic 3-D object scene, as more fully disclosed herein. The DMPH generator component 1208 can comprise, for example, a holographic controller component 1210, a mask generator component 1212, a grating generator component 1214, a calculator component 1216, an optimizer component 1218, a converter component 1220, a cryptographic component 1222, and a CGH component 1224.

The holographic controller component 1210 can control operations relating to generating a 3-D hologram (e.g., full-parallax 3-D Fresnel hologram, such as a DMPH) and/or corresponding 3-D holographic images. The holographic controller component 1210 can facilitate controlling operations being performed by various components of the DMPH generator component 1208, controlling data flow between components of the DMPH generator component 1208, etc.

The mask generator component 1212 can generate a mask pattern that can be overlaid onto or superpositioned with a grating pattern to facilitate generating a DMPH, as more fully disclosed herein. The mask pattern can be a 2-D array of sample object points, wherein each sample object point can have a respective degree of transparency ranging between 0 (e.g., which can represent transparent) and 1 (e.g., which can represent opaque). The mask pattern can be a low-resolution mask, for example.

The grating generator component 1214 can generate a grating pattern G(x,y) that can be superpositioned on the mask pattern to facilitate generating the DMPH, as more fully disclosed herein. The grating pattern can be a 2-D array of sample object points, wherein each sample object point can have a respective degree of transparency ranging between 0 (e.g., which can represent transparent) and 1 (e.g., which can represent opaque). Each sample object point can be taken as a pixel of the grating. The grating pattern can be a high-resolution grating, for example.

The calculator component 1216 can perform calculations on data (e.g., data with respective values), in accordance with various equations (e.g., mathematical expressions), to facilitate generating a hologram. The calculator component 1216 can facilitate calculating, for example, an objective function $O_d$ associated with a hologram, a fitness measurement associated with a chromosome relating to a hologram, etc.

The optimizer component 1218 can perform an optimization process to facilitate determining a mask pattern M(x,y) that has the value of the objective function $O_d$ minimized or at least substantially minimized, in accordance with the defined hologram generation criterion(s). The optimizer component 1218 can perform the optimization process optimization using, for example, an SGA, a PSO, or a DE. In some implementations, the optimizer component 1218 can generate populations (e.g., parent or child populations) of chromosomes associated with a hologram, evaluate the fitness of chromosomes, perform operations (e.g., genetic operations), such as crossover operations or mutation operations, on data (e.g., chromosomes), identifying the weakest individual chromosome in a child population and replacing it with a strongest chromosome from a previous population generation, etc., to facilitate determining the mask pattern M(x,y) that has the value of the objective function $O_d$ minimized or at least substantially minimized The converter component 1220 can convert data from one format, unit, data type, etc., to a different format, unit, data type, etc. In some implementations, the converter component 1220 can convert a mask pattern M(x,y) into a 1-D sequence of numbers by chaining consecutive rows of pixel values, wherein each value can correspond to the level of transparency of the pixel. When the HGC 1200 employs an SGA, the sequence of numbers resulting from the conversion can be referred to as a chromosome.

The cryptographic component 1222 can utilize a desired cryptographic algorithm to encrypt data. In some implementations, the cryptographic component 1222 can encrypt holographic data associated with a hologram (e.g., DMPH), based at least in part on an encryption key, to generate encrypted holographic data, in accordance with the desired cryptographic algorithm. The DMPH generator component 1208 can use the grating generator component 1214 to generate the high-resolution grating pattern to be or include the encryption key that can be used to facilitate decrypting the encrypted holographic data by the display component to facilitate presenting the reconstructed holographic images in a form that corresponds to the original 3-D object scene.

In some embodiments, the CGH component 1224 can be used to generate a synthesized 3-D object scene. The synthesized 3-D object scene can be, for example, a model of a 3-D object scene that does not actually exist in the real world. The CGH component 1224 also can generate a hologram file that can be used by the HGC 1200 to generate a hologram from the synthesized 3-D object scene.

The HGC 1200 also can comprise a processor component 1226 that can operate in conjunction with the other components (e.g., communicator component 1202, aggregator component 1204, analyzer component 1206, DMPH generator component 1208, etc.) to facilitate performing the various functions of the HGC 1200. The processor component 1226 can employ one or more processors (e.g., central processing units (CPUs), graphics processing unit (GPUs), field-programmable gate arrays (FPGAs), etc.), microprocessors, or controllers that can process data, such as information (e.g., visual information) relating to a 3-D object scene, holographic data, data relating to parameters associated with the HGC 1200 and associated components, etc., to facilitate generating holograms (e.g., full-parallax 3-D Fresnel holograms, such as DMPHs) and corresponding holographic images representative of a 3-D object scene; and can control data flow between the HGC 1200 and other components associated with the HGC 1200.

In yet another aspect, the HGC 1200 can contain a data store 1228 that can store data structures (e.g., user data, metadata); code structure(s) (e.g., modules, objects, classes, procedures), commands, or instructions; information relating to object points; information relating to (e.g., representative of) a 3-D object scene; information relating to mask patterns or grating patterns; holographic data; parameter data; algorithms (e.g., hologram-generation algorithm, SGA, PSO algorithm, DE algorithm, cryptographic algorithm, etc.); hologram generation criterion(s); and so on. In an aspect, the processor component 1226 can be functionally coupled (e.g., through a memory bus) to the data store 1228 in order to store and retrieve information desired to operate and/or confer functionality, at least in part, to the communicator component 1202, aggregator component 1204, analyzer component 1206, DMPH generator component 1208, etc., and/or substantially any other operational aspects of the HGC 1200. It is to be appreciated and understood that the various components of the HGC 1200 can communicate information between each other and/or between other components associated with the HGC 1200 as desired to carry out operations of the HGC 1200. It is to be further appreciated and understood that respective components (e.g., communicator component 1202, aggregator component 1204, analyzer component 1206, DMPH generator component 1208, etc.) of the HGC 1200 each can be a stand-alone unit, can be included within the HGC 1200 (as depicted), can be incorporated within another component of the HGC 1200 (e.g., DMPH generator component 1208) or component separate from the HGC 1200, and/or virtually any suitable combination thereof, as desired.

It is to be appreciated and understood that, in accordance with various other aspects and embodiments, the HGC 1200 or components associated therewith can include or be associated with other components (not shown for reasons of brevity), such as, for example, a modeler component (e.g., to facilitate generating model data that can be used to generate or display a hologram), adapter components (e.g., to facilitate adapting or modifying holographic images or data to facilitate desirably generating or displaying the hologram), a reference beam component (e.g., to apply a reference beam to a 3-D object scene and/or a 3-D hologram), a render component (e.g., to render or convert data, such as model data or diffraction pattern data, associated with the 3-D object scene into corresponding holographic data, which can be used to generate a hologram that is a reproduction of the 3-D object scene), a reflector component(s) (e.g., to reflect holographic images to facilitate display of the hologram), and/or display partitions (e.g., to partition a display into a desired number of partitions in order to show different views of the hologram), etc., that can be employed to facilitate generating a hologram and/or generating or displaying corresponding holographic images representing a 3-D object scene.

Figure 13:
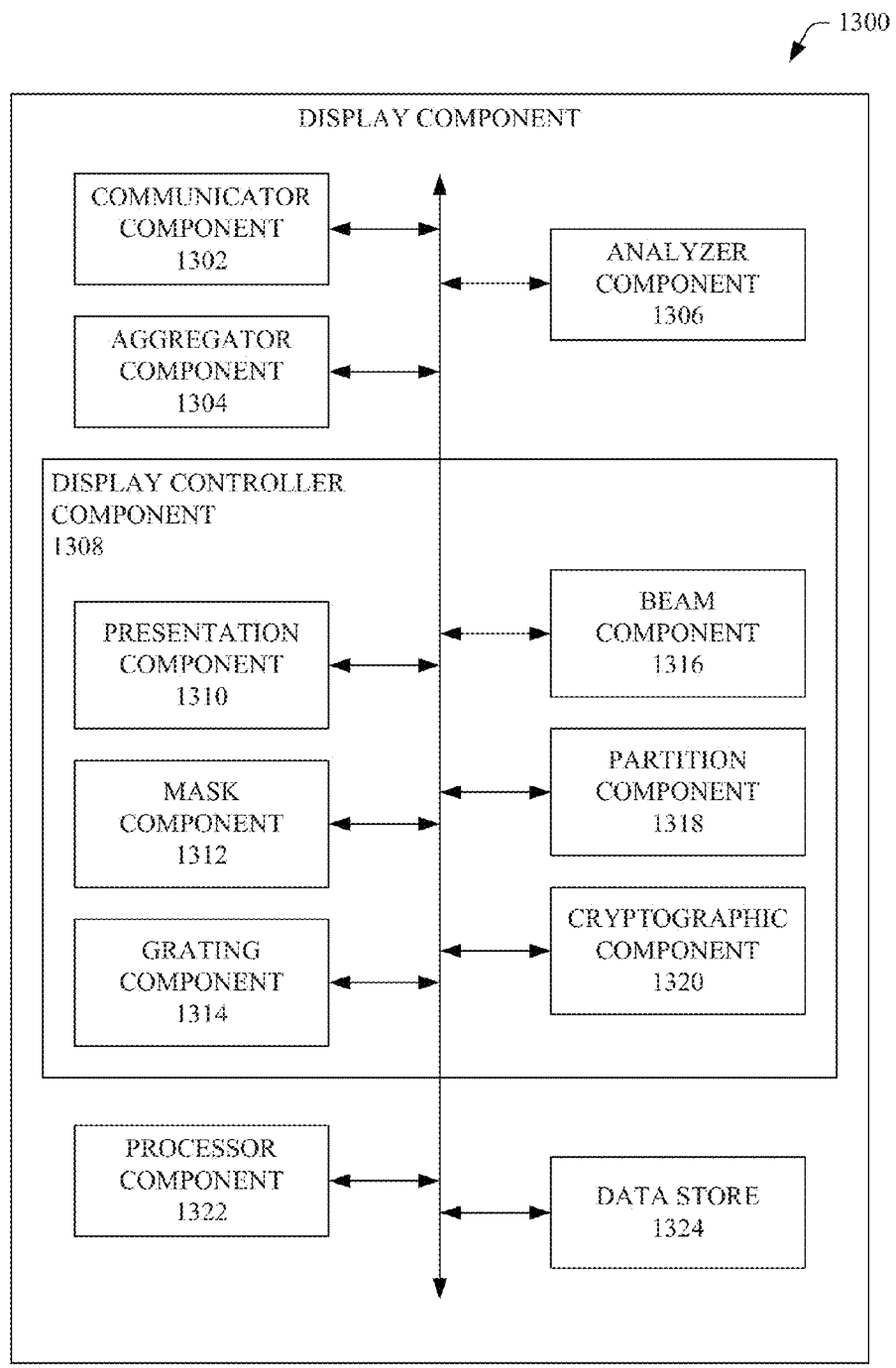
FIG. 13 depicts a block diagram of an example display component that can efficiently display a 3-D hologram(s) of a real or synthetic 3-D object scene(s) in accordance with various aspects and implementations of the disclosed subject matter.

FIG. 13 depicts a block diagram of an example display component 1300 that can efficiently display a 3-D hologram(s) (e.g., 3-D Fresnel hologram(s)) of a real or synthetic 3-D object scene(s) in accordance with various aspects and implementations of the disclosed subject matter. The display component 1300 can include a communicator component 1302 that can be used to communicate (e.g., transmit, receive) information between the display component 1300 and other components (e.g., HGC(s), processor component(s), user interface(s), data store(s), etc.). The information can include, for example, holograms or holographic images, information relating defined hologram generation criterion(s), information relation to an algorithm(s) that can facilitate displaying of holograms or holographic images, etc.

The display component 1300 can comprise an aggregator component 1304 that can aggregate data received (e.g., obtained) from various entities (e.g., HGC(s), processor component(s), user interface(s), data store(s), etc.). The aggregator component 1304 can correlate respective items of data based at least in part on type of data, source of the data, time or date the data was generated or received, object point with which data is associated, pixel with which a transparency level is associated, visual perspective with which data is associated, etc., to facilitate processing of the data (e.g., analyzing of the data by the analyzer component 1306).

The analyzer component 1306 can analyze data to facilitate generating a mask image, generating a grating image, superposing or overlaying the grating image with or on the mask image to generate a DMPH, generating the hologram (e.g., DMPH), etc., and can generate analysis results, based at least in part on the data analysis. For example, the analyzer component 1306 can analyze data relating to a mask image or a grating image for a hologram to facilitate generating holographic images that can correspond to the hologram. The analyzer component 1306 can provide analysis results relating to, for example, a display controller component 1308 or another component (e.g., processor component 1322, data store 1324, etc.). Based at least in part on the results of this analysis, the display component 1300 (e.g., using the display controller component 1308) can generate, reconstruct, or reproduce 3-D holographic images, based at least in part on the 3-D hologram, and can present (e.g., display) the 3-D holographic images for viewing.

The display controller component 1308 can control operations relating to generating reconstructing, or reproducing 3-D holographic images based at least in part on a 3-D hologram (e.g., DMPH), and displaying of the 3-D holographic images. The display controller component 1308 can include a presentation component 1310, mask component 1312, grating component 1314, beam component 1316, partition component 1318, and cryptographic component 1320.

The presentation component 1310 can include one or more display units that can be used to present (e.g., display) holographic images. In some implementations, the one or more display units can be low-resolution display units, such as, for example, low-resolution LCDs or LCoS displays. A display unit can be partitioned (e.g., logically) into a tile structure (e.g., by the partition component 1318) to facilitate the display of multiple holographic images on a single display unit. In accordance with various implementations, a display unit can be a binary display unit or a multi-level display unit, as more fully disclosed herein.

The mask component 1312 can be employed to generate a mask pattern or image to facilitate generating a DMPH associated with a 3-D object scene. The mask image can be a 2-D array of sample object points, wherein each sample object point can have a respective degree of transparency ranging between 0 (e.g., which can represent transparent) and 1 (e.g., which can represent opaque). The mask image can be a low-resolution mask, for example.

The grating component 1314 can generate a grating pattern or image to facilitate generating a DMPH associated with a 3-D object scene. The grating image can be a 2-D array of sample object points, wherein each sample object point can have a respective degree of transparency ranging between 0 (e.g., which can represent transparent) and 1 (e.g., which can represent opaque). Each sample object point can be taken as a pixel of the grating. The grating image can be a high-resolution grating, for example. The DMPH can be generated in part by overlaying the mask image onto, or superposing (or superpositioning) the mask image with, the grating image, as more fully disclosed herein.

The beam component 1316 can generate an illumination beam that can be applied to the one or more display units (e.g., low-resolution LCD) and/or grating (e.g., high-resolution grating) to facilitate generating, reconstructing, or reproducing 3-D holographic images based at least in part on the 3-D hologram (e.g., DMPH). The beam component 1316 can apply an illumination beam to each display unit at a desired angle (e.g., incident angle).

The partition component 1318 can be employed to partition (e.g., logically) a display screen of a display unit into a tile structure to facilitate the display of multiple holographic images on a single display unit. The partition component 1318 can partition a display screen of a display unit into a tile structure when a single display unit is being used to present holographic images.

The cryptographic component 1320 can use the encryption key contained or integrated in a grating to facilitate decrypting encrypted holographic data associated with an encrypted holographic image associated with a hologram, in accordance with a desired cryptographic algorithm. For instance, the encrypted holographic image can be presented by the display unit. The high-resolution grating, which can be associated with (e.g., attached to or superpositioned with) the display unit, can be structured to include the encryption key. The cryptographic component 1320 can use the encryption key of the high-resolution grating to decrypt the encrypted holographic image to generate the holographic image in a form that can correspond to the original 3-D object scene to facilitate presenting the holographic image to a viewer.

The display component 1300 also can comprise a processor component 1322 that can operate in conjunction with the other components (e.g., communicator component 1302, aggregator component 1304, analyzer component 1306, display controller component 1308, etc.) to facilitate performing the various functions of the display component 1300. The processor component 1322 can employ one or more processors (e.g., CPUs, GPUs, FPGAs, etc.), microprocessors, or controllers that can process data, such as information (e.g., visual information) relating to a hologram representative of a 3-D object scene, holographic data, data relating to parameters associated with the display component 1300 and associated components, etc., to facilitate generating holographic images (e.g., full-parallax 3-D Fresnel holographic images that can correspond to holograms, such as, for example, DMPHs) representative of a 3-D object scene; and can control data flow between the display component 1300 and other components associated with the display component 1300.

In yet another aspect, the display component 1300 can contain a data store 1324 that can store data structures (e.g., user data, metadata); code structure(s) (e.g., modules, objects, classes, procedures), commands, or instructions; information relating to object points; information relating to a hologram associated with (e.g., representative of) a 3-D object scene; information relating to mask images or grating images; holographic data; parameter data; algorithms (e.g., hologram-generation algorithm, cryptographic algorithm, etc.); hologram generation criterion(s); one or more look-up tables; and so on. In an aspect, the processor component 1322 can be functionally coupled (e.g., through a memory bus) to the data store 1324 in order to store and retrieve information desired to operate and/or confer functionality, at least in part, to the communicator component 1302, aggregator component 1304, analyzer component 1306, display controller component 1308, etc., and/or substantially any other operational aspects of the display component 1300. It is to be appreciated and understood that the various components of the display component 1300 can communicate information between each other and/or between other components associated with the display component 1300 as desired to carry out operations of the display component 1300. It is to be further appreciated and understood that respective components (e.g., communicator component 1302, aggregator component 1304, analyzer component 1306, display controller component 1308, etc.) of the display component 1300 each can be a stand-alone unit, can be included within the display component 1300 (as depicted), can be incorporated within another component of the display component 1300 (e.g., display controller component 1308) or component separate from the display component 1300, and/or virtually any suitable combination thereof, as desired.

Figure 14:
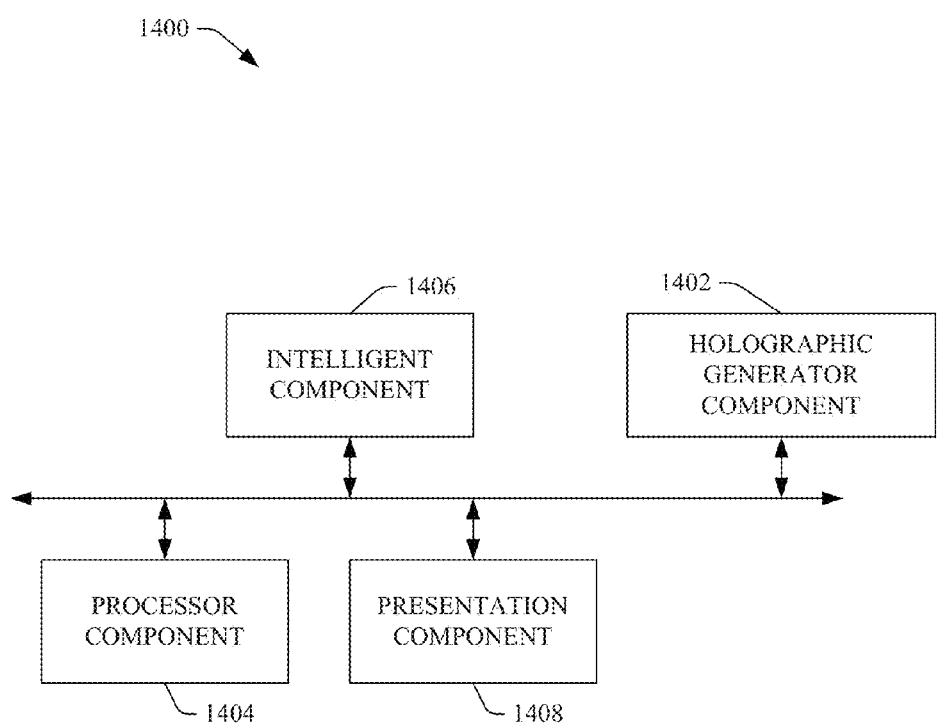
FIG. 14 presents a block diagram of a system that can employ intelligence to facilitate generation of a 3-D hologram of a real or synthetic 3-D object scene in accordance with an embodiment of the disclosed subject matter.

Referring to FIG. 14, depicted is a block diagram of a system 1400 that can employ intelligence to facilitate generation of a 3-D hologram (e.g., a full-parallax 3-D Fresnel hologram) of a real or synthetic 3-D object scene in accordance with an embodiment of the disclosed subject matter. The system 1400 can include an HGC 1402 that can desirably generate a hologram (e.g., sequence of 3-D holographic images) that can represent a 3-D object scene (e.g., real or computer-synthesized 3-D object scene from multiple different viewing perspectives of a 3-D object scene that can correspond to multiple different viewing perspectives of the 3-D object scene, as more fully disclosed herein. It is to be appreciated that the HGC 1402 can be the same or similar as respective components (e.g., respectively named components), and/or can contain the same or similar functionality as respective components, as more fully described herein. The HGC 1402 can include a DMPH generator component (not shown in FIG. 14; e.g., as depicted in, or described herein in relation to, FIGS. 1 and 13) that can generate a full-parallax digital 3-D hologram (e.g., Fresnel hologram) to facilitate generating or reconstructing full-parallax digital 3-D holographic images (e.g., 3-D Fresnel holographic images) that can represent or recreate the original real or synthetic 3-D object scene, as more fully disclosed herein.

The system 1400 can further include a processor component 1404 that can be associated with (e.g., communicatively connected to) the HGC 1402 and/or other components (e.g., components of system 1400) via a bus. In accordance with an embodiment of the disclosed subject matter, the processor component 1404 can be an applications processor(s) that can manage communications and run applications. For example, the processor component 1404 can be a processor that can be utilized by a computer, mobile computing device, personal data assistant (PDA), or other electronic computing device. The processor component 1404 can generate commands in order to facilitate generating holograms and/or displaying of holographic image of a 3-D object scene from multiple different viewing perspectives corresponding to the multiple different viewing perspectives of the 3-D object scene obtained or created by the HGC 1402, modifying parameters associated with the HGC 1402, etc.

The system 1400 also can include an intelligent component 1406 that can be associated with (e.g., communicatively connected to) the HGC 1402, the processor component 1404, and/or other components associated with system 1400 to facilitate analyzing data, such as current and/or historical information, and, based at least in part on such information, can make an inference(s) and/or a determination(s) regarding, for example, generation of a 3-D hologram and/or 3-D holographic image based at least in part on a 3-D object scene, setting of parameters associated with the HGC 1402 and associated components, etc.

For example, based in part on current and/or historical evidence, the intelligent component 1406 can infer a superposing of a mask pattern in relation to a grating pattern, a mask pattern for optimizing the objective function $O_d$, a fitness measurement for a chromosome, respective parameter values of one or more parameters to be used with regard to operations by the HGC 1402, etc.

In an aspect, the intelligent component 1406 can communicate information related to the inferences and/or determinations to the HGC 1402. Based at least in part on the inference(s) or determination(s) with respect to such data by the intelligent component 1406, the HGC 902 can take (e.g., automatically or dynamically take) one or more actions to facilitate generating a 3-D hologram and/or a 3-D holographic image of a 3-D object scene from multiple different viewing perspectives corresponding to the multiple different viewing perspectives of a 3-D object scene obtained or generated by the HGC 1402, etc.

It is to be understood that the intelligent component 1406 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 1400 also can include a presentation component 1408, which can be connected with the processor component 1404. The presentation component 1408 can provide various types of user interfaces to facilitate interaction between a user and any component coupled to the processor component 1404. As depicted, the presentation component 1408 is a separate entity that can be utilized with the processor component 1404 and associated components. However, it is to be appreciated that the presentation component 1408 and/or similar view components can be incorporated into the processor component 1404 and/or a stand-alone unit. The presentation component 1408 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 1404.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the HGC 1402 and/or other components, can be situated or implemented on a single integrated-circuit chip. In accordance with another embodiment, the HGC 1402, and/or other components, can be implemented on an application-specific integrated-circuit (ASIC) chip. In yet another embodiment, the HGC 1402 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 15-18 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Figure 15:
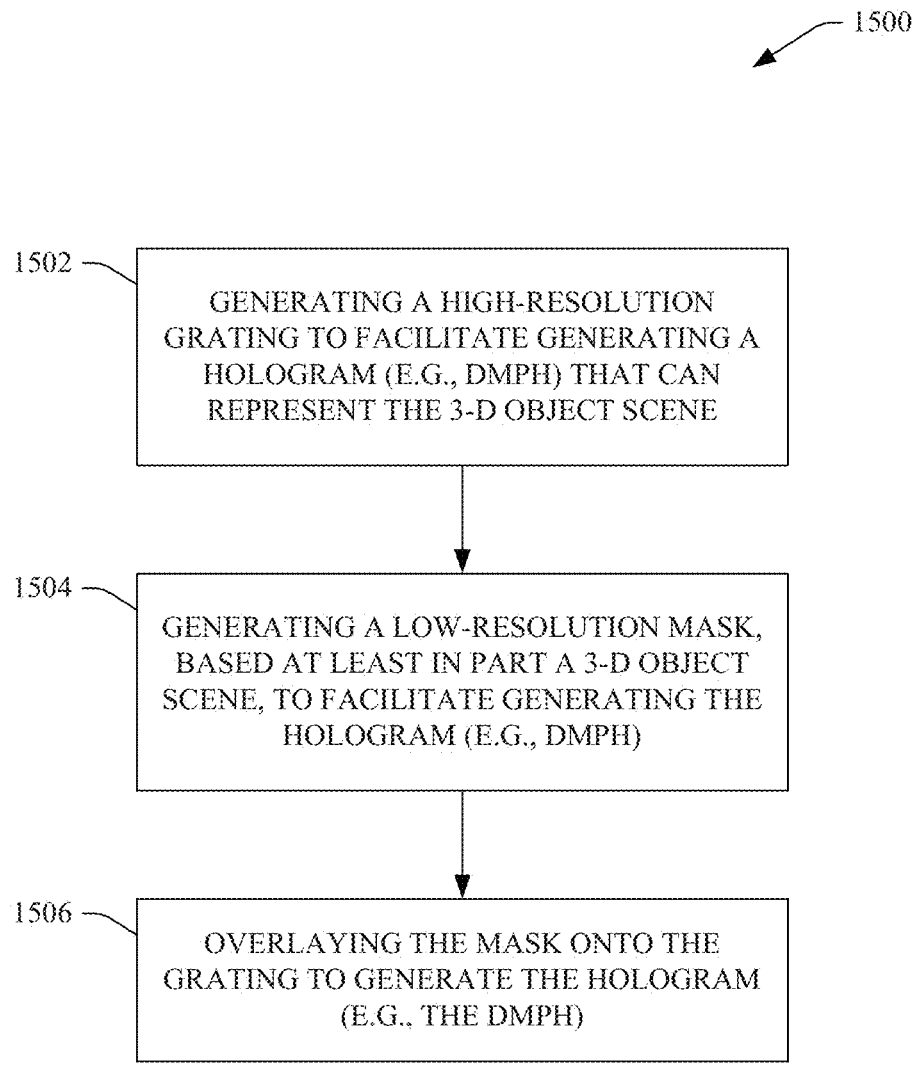
FIG. 15 illustrates a flow diagram of an example method for generating a 3-D hologram(s) of a real or synthetic 3-D object scene(s) in accordance with various embodiments and aspects of the disclosed subject matter.

Referring to FIG. 15, illustrated is a flow diagram of an example method 1500 for generating a 3-D hologram(s) (e.g., full-parallax 3-D Fresnel hologram(s)) of a real or synthetic 3-D object scene(s) in accordance with various embodiments and aspects of the disclosed subject matter. At 1502, a high-resolution grating can be generated to facilitate generating a hologram (e.g., DMPH) that can represent a 3-D object scene. An HGC and/or a display component can generate the high-resolution grating (e.g., grating pattern or image) that can be composed of a 2-D array of sample object points. The HGC or display component can assign a level of transparency ranging from totally transparent (e.g., represented by a 0) to totally opaque (e.g., represented by a 1) to each sample object point of the grating, wherein each sample object point can be taken as a pixel of the grating.

At 1504, a low-resolution mask can be generated, based at least in part the 3-D object scene, to facilitate generating the hologram (e.g., DMPH). The HGC and/or display component can generate the low-resolution mask (e.g., mask pattern or image) that can be composed of a 2-D array of sample object points. The HGC or display component can assign a level of transparency ranging from totally transparent (e.g., represented by a 0) to totally opaque (e.g., represented by a 1) to each sample object point of the mask. The size of the mask, and the separation between sample object points (e.g., sampling pitch), respectively, can be identical or at least substantially identical to that of the grating.

The HGC or display component can generate the mask $M(x, y)$ (e.g., mask image or pattern) to have it partitioned (e.g., evenly partitioned) into non-overlapping square blocks each with a desired size, such as, for example, $k \times k$ pixels, wherein k is an integer that can be larger than unity. For example, within each square block, the HGC or display component can set all of the pixels to an identical transparency between 0 and 1, wherein each square block can be taken as a pixel of the mask. As such, the resolution of the mask can be $(1/k)$th of that of grating image $G(x, y)$ along the horizontal and the vertical directions. That is, the pixel size of the mask can be k times larger than that of the grating along the horizontal and the vertical directions.

At 1506, the mask can be overlaid onto the grating to generate the hologram (e.g., the DMPH). The HGC or display component can overlay the mask onto the grating (e.g., can superposition the mask and the grating) to generate the hologram. A low-resolution display, such as an LCD, can be used to display the hologram. An illumination beam can be applied to the hologram to facilitate generating 3-D holographic images on the low-resolution display for presentation to a viewer.

Figure 16:
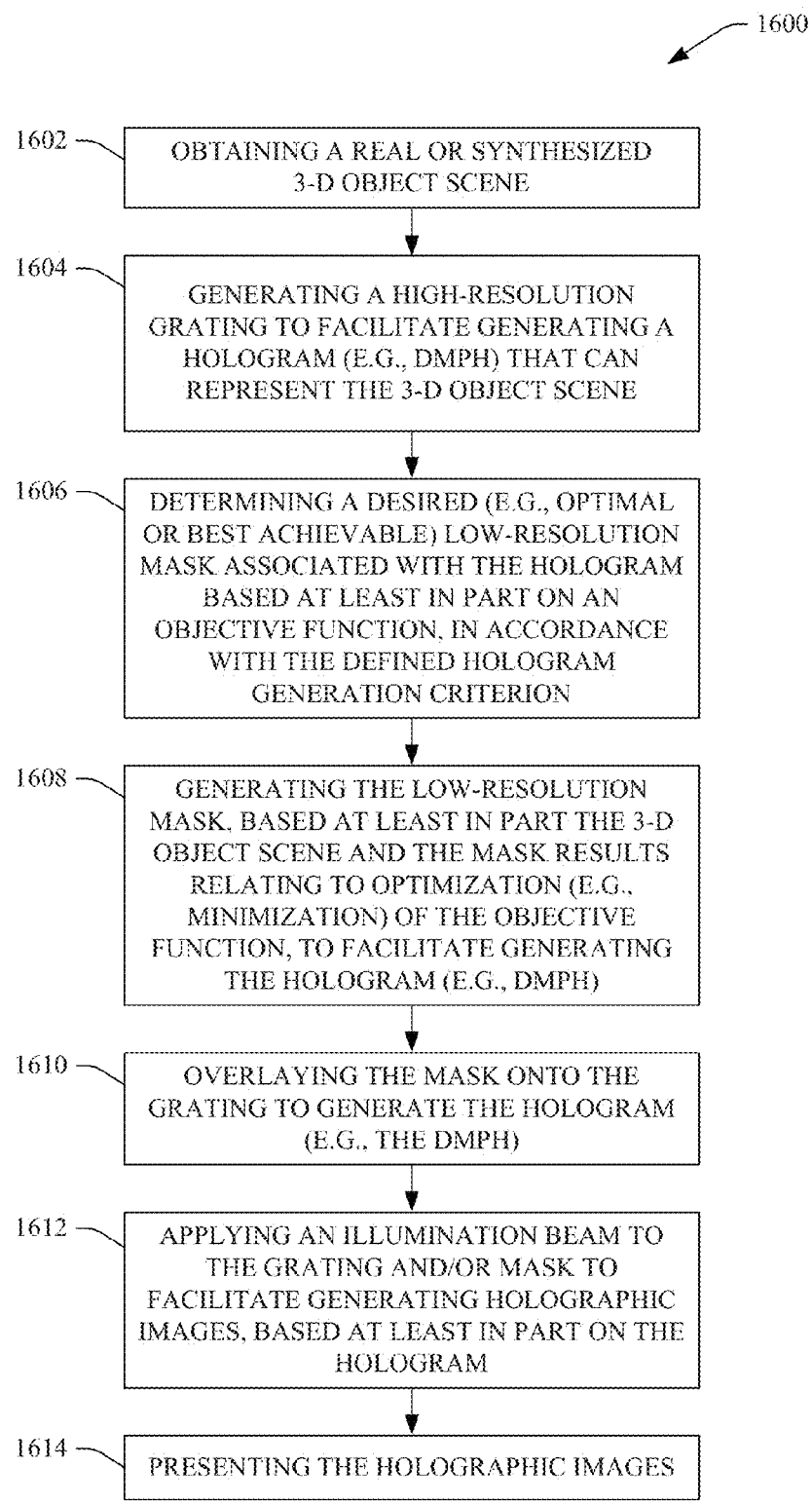
FIG. 16 depicts a flow diagram of another example method for efficiently generating a 3-D hologram(s) of a real or synthetic 3-D object scene(s) in accordance with various embodiments and aspects of the disclosed subject matter.

Turning to FIG. 16, depicted is a flow diagram of another example method 1600 for efficiently generating a 3-D hologram(s) (e.g., full-parallax 3-D Fresnel hologram(s)) of a real or synthetic 3-D object scene(s) in accordance with various embodiments and aspects of the disclosed subject matter. At 1602, a real or synthesized 3-D object scene can be obtained. The HGC can receive a real or synthesized 3-D object scene, or can generate a synthesized 3-D object scene. At 1604, a high-resolution grating can be generated (e.g., by the HGC) to facilitate generating a hologram (e.g., DMPH) that can represent the 3-D object scene.

At 1606, a desired (e.g., optimal or best achievable) low-resolution mask associated with the hologram can be determined based at least in part on an objective function, in accordance with the defined hologram generation criterion(s). The HGC can determine or identify a mask associated with the hologram based at least in part on the objective function. The HGC can perform an iterative optimization process to determine or identify a mask that can minimize or at least substantially minimize a value of the objective function $O_d$, in accordance with the defined hologram generation criterion(s), as more fully disclosed herein. The HGC can generate mask results that can identify the desired low-resolution mask to be used to facilitate desirably reconstructing the target image (e.g., a planar target image that can be located a defined distance from the hologram). At 1608, the low-resolution mask can be generated (e.g., by the HGC), based at least in part the 3-D object scene and the mask results relating to optimization (e.g., minimization) of the objective function, to facilitate generating the hologram (e.g., DMPH).

At 1610, the mask can be overlaid onto the grating (e.g., by the HGC) to generate the hologram (e.g., the DMPH). The HGC can overlay the mask onto the grating (e.g., can superposition the mask and the grating) to generate the hologram.

At 1612, an illumination beam can be applied to the grating and/or mask to facilitate generating holographic images (e.g., full-parallax 3-D Fresnel holographic images), based at least in part on the hologram, wherein the holographic images can correspond to the 3-D object scene. The display component can generate an illumination beam and can apply the illumination beam, at a desired angle (e.g., incident angle), to the grating and/or mask. In some implementations, the grating and mask can be arranged in relation to each other to have the grating positioned between the mask and the illumination beam. In other implementations, the grating and mask can be arranged in relation to each other to have the mask positioned between the grating and the illumination beam.

At 1614, the holographic images can be presented. The display component can present the holographic images, for example, for viewing by one or more viewers. The holographic images can reproduce the original 3-D object scene from multiple viewing perspectives with full parallax.

Figure 17:
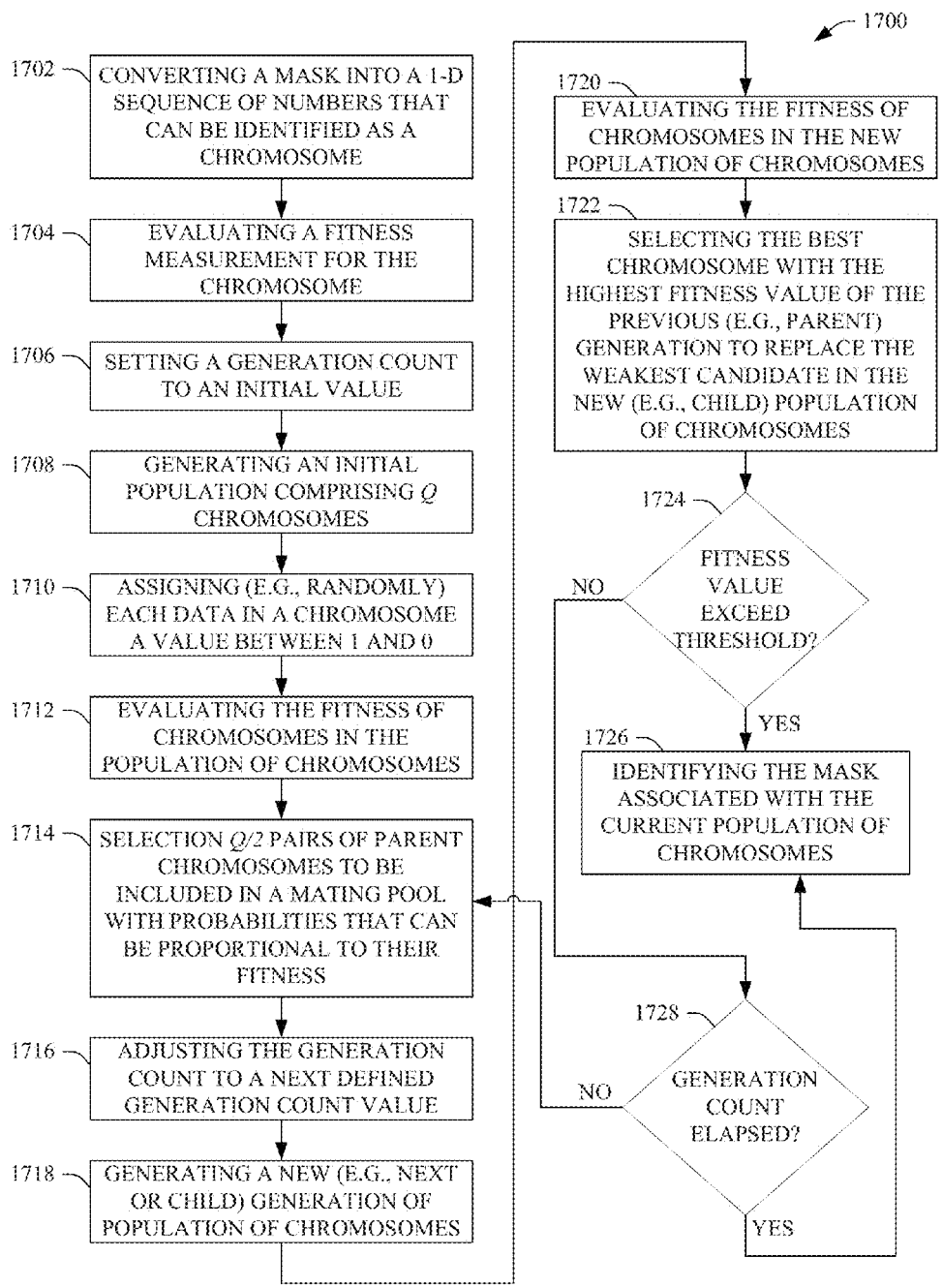
FIG. 17 presents a flow diagram of an example method for determining a mask to facilitate generating a 3-D hologram(s) of a real or synthetic 3-D object scene(s) in accordance with various embodiments and aspects of the disclosed subject matter.

FIG. 17 presents a flow diagram of an example method 1700 for determining a mask to facilitate generating a 3-D hologram(s) (e.g., full-parallax 3-D Fresnel hologram(s)) of a real or synthetic 3-D object scene(s) in accordance with various embodiments and aspects of the disclosed subject matter. The method 1700 can employ an optimization process that can determine or identify a mask that can minimize or at least substantially minimize a value of an objective function $O_d$, in accordance with the defined hologram generation criterion(s). The objective function is defined to determine the RMSE between the reconstructed image and a planar target image that can be located at a specified distance from the hologram. The method 1700 can use any of a number of desired optimization algorithms or processes to facilitate determining the mask. For example, the method 1700 can employ an SGA, a PSO process or algorithm, or a DE process or algorithm. For reasons of brevity and clarity, the method 1700 is primarily described herein in relation to determining the mask using the SGA.

At 1702, a mask can be converted into a 1-D sequence of numbers that can be identified as a chromosome. The HGC (e.g., using the DMPH generator component) can convert the mask M(x, y) (e.g., mask image or pattern) into a 1-D sequence of numbers by chaining consecutive rows of pixel values, wherein each pixel value can correspond to the transparency of the pixel. In the context of SGA, the sequence can be referred as a chromosome and its structure can be depicted, for example, as:

M(0,0) M(0,k) M(0,2k)–M(0,Y/k−1) M(k,Y/k−1)–M(X/k−1,Y/k−1)

The chromosome can be interpreted as a 1-D array of data of length $N=XY/k^2$, and with the nth data ($0 \leq n < XY/k^2$) that can be equal to M(floor(nk/Y),mod(nk,Y)), wherein floor(a) can be the largest integer that is not greater than a, and mod (a,b) can be the remainder of a/b.

At 1704, a fitness measurement can be evaluated for the chromosome. The DMPH generator component can evaluate the fitness measurement for the chromosome. The DMPH generator component can determine (e.g., calculate) the fitness measurement as a function of the objective function $O_d$, as more fully disclosed herein.

At 1706, a generation count t can be set to an initial value (e.g., 0). The DMPH generator component can set the generation count t to the defined initial value. At 1708, an initial population comprising Q chromosomes can be generated. The DMPH generator can generate an initial population comprising Q chromosomes, wherein Q can be a desired integer number.

At 1710, each data in a chromosome can be assigned (e.g., randomly assigned) a value between 1 and 0. The DMPH generator component can randomly assign each data in a chromosome a value between 1 and 0, inclusive, with uniform or at least substantially uniform probability.

At 1712, the fitness of all or at least a portion of the chromosomes in the population of chromosomes can be evaluated. The DMPH generator component can evaluate the fitness of all or at least a portion of the chromosomes in the population of chromosomes, for example, in accordance with a mathematical expression (e.g., Equation 4), in accordance with the disclosed subject matter.

At 1714, Q/2 pairs of parent chromosomes can be selected to be included in a mating pool with probabilities that can be proportional to their fitness. The DMPH generator component can select Q/2 pairs of parent chromosomes into a mating pool with probabilities that can be proportional to their fitness. At 1716, the generation count t can be adjusted to a next defined generation count value. The DMPH generator component can adjust the generation count t to a next defined generation count value. For example, the DMPH generator component can increase the generation count t by 1.

At 1718, a new (e.g., next or child) generation of population of chromosomes can be generated. The DMPH generator component can generate or establish the new generation of population (also referred to as the child population) of chromosomes (e.g., Q chromosomes) by applying either one of the genetic operations, which can be the crossover operation or the mutation operation with respective probabilities $p_c$ and $p_m$, to each pair of parent chromosomes, respectively. For the crossover operation, the DMPH generator component can exchange or mix each corresponding pair of data in the parent strings according to certain defined rules. For example, one of the defined rules can be to have the DMPH generator component swap the pair of data with a probability $q_c$. Regarding mutation, the DMPH generator component can select (e.g., randomly select) the data in the parent chromosomes with a probability $q_m$, and the DMPH generator component can change the value of each of the selected data to a random value.

At 1720, the fitness of all or at least a portion of the chromosomes in the new (e.g., child) population of chromosomes can be evaluated. The DMPH generator component can evaluate the fitness of all or at least a portion of the respective chromosomes of all in the new population of chromosomes, for example, in accordance with a mathematical expression (e.g., Equation 4), in accordance with the disclosed subject matter.

At 1722, the best chromosome with the highest fitness value of the previous (e.g., parent) generation can be selected to replace the weakest candidate in the new (e.g., child) population of chromosomes. In the progression from the parent population to the child population, the DMPH generator component can preserve and select the best chromosome (e.g., the elite) with the highest fitness value of the previous (e.g., parent) generation to replace the weakest candidate in the new (e.g., child) population of chromosomes. For instance, the DMPH generator component can apply the elite principle or rule by identifying the weakest individual chromosome in the child population of chromosomes and replacing it with the strongest chromosome in the previous (e.g., parent) generation of chromosomes.

At 1724, a determination can be made regarding whether the fitness value associated with the current population of chromosomes exceeds a defined minimum threshold fitness value. The DMPH generator component can compare the fitness value associated with the current population of chromosomes (e.g., as modified at act 1722, for example, in accordance with the elite principle) exceeds a defined minimum threshold fitness value. If the fitness value associated with the current population of chromosomes exceeds the defined minimum threshold fitness value, at 1726, the mask associated with (e.g., corresponding to) the current population of chromosomes can be determined or identified. In response to determining that the fitness value associated with the current population of chromosomes exceeds the defined minimum threshold fitness value, the DMPH generator component can determine that the current population of chromosomes can correspond to a mask that can be used as part of the hologram (e.g., DMPH) to suitably approximate a target image (e.g., a planar target image that can be located a defined distance from the hologram).

If, at 1724, it is determined that the fitness value associated with the current population of chromosomes does not exceeds the defined minimum threshold fitness value, at 1728, a determination can be made regarding whether a defined threshold maximum allowable number of generations has elapsed based at least in part on the generation count t. In response to determining that the fitness value associated with the current population of chromosomes does not exceed the defined minimum threshold fitness value, the DMPH generator component can whether the defined threshold maximum allowable number of generations has elapsed based at least in part on the generation count t. The DMPH generator component can compare the current generation count to the defined threshold maximum allowable number of generations to facilitate determining whether the defined threshold maximum allowable number of generations has elapsed.

If it is determined that the generation count t is less than the defined threshold maximum allowable number of generations, the method 1700 can return to reference numeral 1714, wherein Q/2 pairs of parent chromosomes (wherein the current population of chromosomes can now be the parent chromosomes) can be selected to be included in a mating pool with probabilities that can be proportional to their fitness, and the method 1700 can continue to proceed from that point. In response to determining that the defined threshold maximum allowable number of generations has not elapsed, the DMPH generator component can continue to execute the method of 1700 by returning to the aspect associated with reference numeral 1714, wherein the DMPH generator component can select Q/2 pairs of parent chromosomes (e.g., the current population of chromosomes, which can now be the parent chromosomes) to be included in a mating pool with probabilities that can be proportional to their fitness. The method 1700 can continue from that point.

Referring again to reference numeral 1728, if, at 1728, it is determined that the generation count t is equal to the defined threshold maximum allowable number of generations, it can be determined that the defined threshold maximum allowable number of generations has elapsed, and the method 1700 can return to reference numeral 1726, wherein the mask associated with the current population of chromosomes can be determined or identified. At this point, in accordance with the defined hologram generation criterion(s) (e.g., placing a limit on the number of generations to be evaluated), with the maximum threshold being elapsed, the DMPH generator component can determine that the current population of chromosomes can correspond to a mask that can be used as part of the hologram (e.g., DMPH) to suitably (e.g., acceptably) approximate the target image (e.g., a planar target image, as disclosed herein). At this point, the method 1700 can end.

Figure 18:
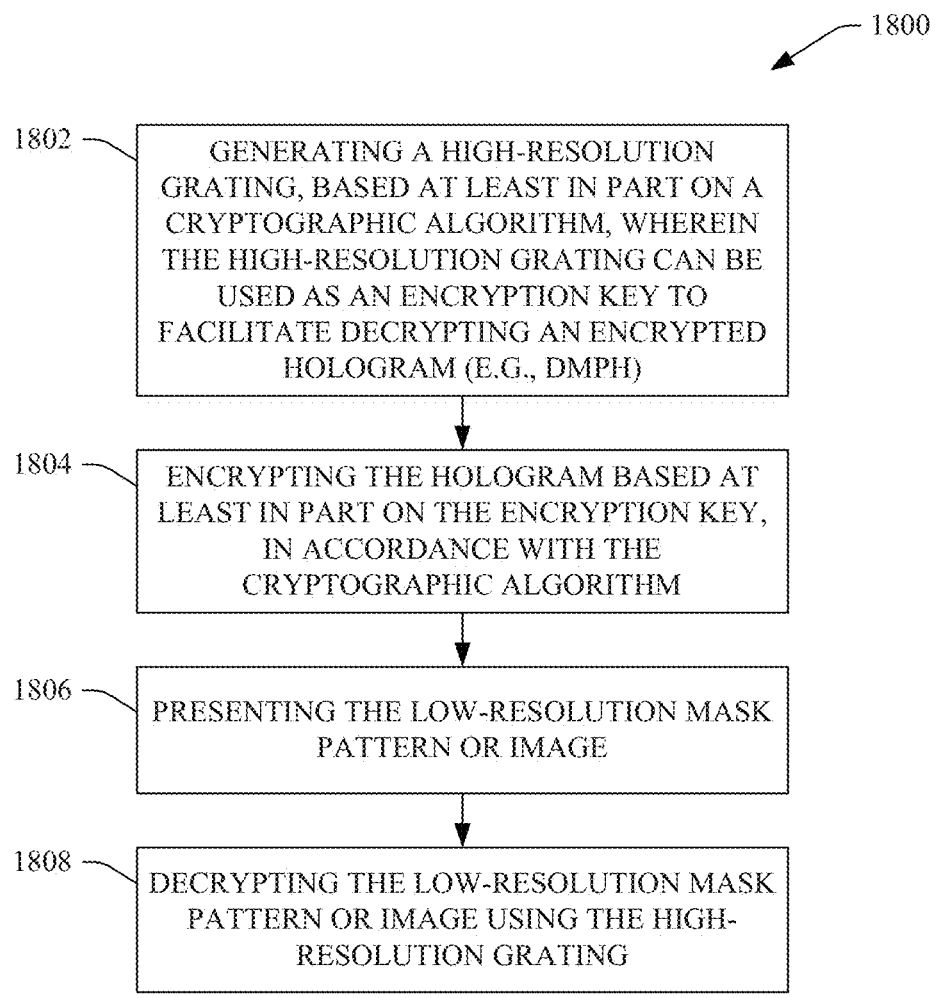
FIG. 18 illustrates a flow diagram of an example method for encrypting holographic data and generating a 3-D hologram(s) of a real or synthetic 3-D object scene(s) in accordance with various embodiments and aspects of the disclosed subject matter.

FIG. 18 illustrates a flow diagram of an example method 1800 for encrypting holographic data and generating a 3-D hologram(s) (e.g., full-parallax 3-D Fresnel hologram(s)) of a real or synthetic 3-D object scene(s) in accordance with various embodiments and aspects of the disclosed subject matter. At 1802, a high-resolution grating can be generated, based at least in part on a cryptographic algorithm, wherein the high-resolution grating can be used as an encryption key to facilitate decrypting an encrypted hologram (e.g., DMPH). The HGC (e.g., using the DMPH generator component) can generate the high-resolution grating based at least in part the cryptographic algorithm.

At 1804, the hologram can be encrypted based at least in part on the encryption key, in accordance with the cryptographic algorithm. The HGC can generate the hologram, which can include a low-resolution mask pattern and the high-resolution grating pattern, and can encrypt the low-resolution mask pattern or image using the encryption key (e.g., an encryption key that can correspond to the encryption key associated with the grating).

At 1806, the low-resolution mask pattern or image can be presented. A display component can receive the hologram and can reproduce and present the low-resolution mask pattern or image (e.g., the encrypted mask pattern or image) to facilitate display of holographic images associated with the hologram.

At 1808, the low-resolution mask pattern or image can be decrypted using the high-resolution grating. The mask can be overlaid on the grating. The display component can apply an illumination beam to the hologram, comprising the mask and grating, to facilitate displaying the holographic image. The high-resolution grating, as the encryption key (e.g., encryption/decryption key), can decrypt the encrypted low-resolution mask image to facilitate generating the holographic image, which can correspond to the original 3-D object scene when the mask is decrypted. The display component can display the holographic image for viewing.

Figure 19:
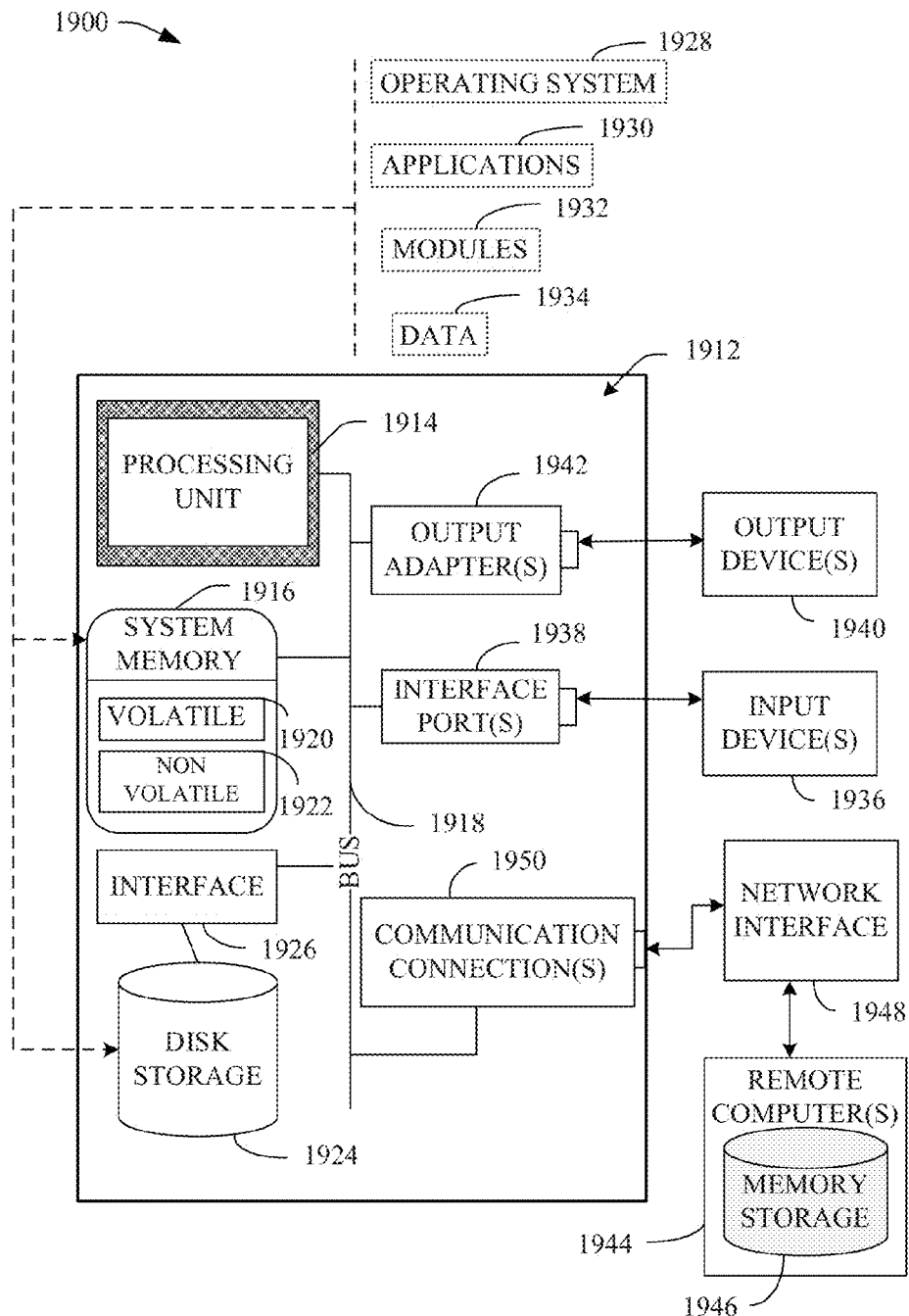
FIG. 19 is a schematic block diagram illustrating a suitable operating environment.
Figure 20:
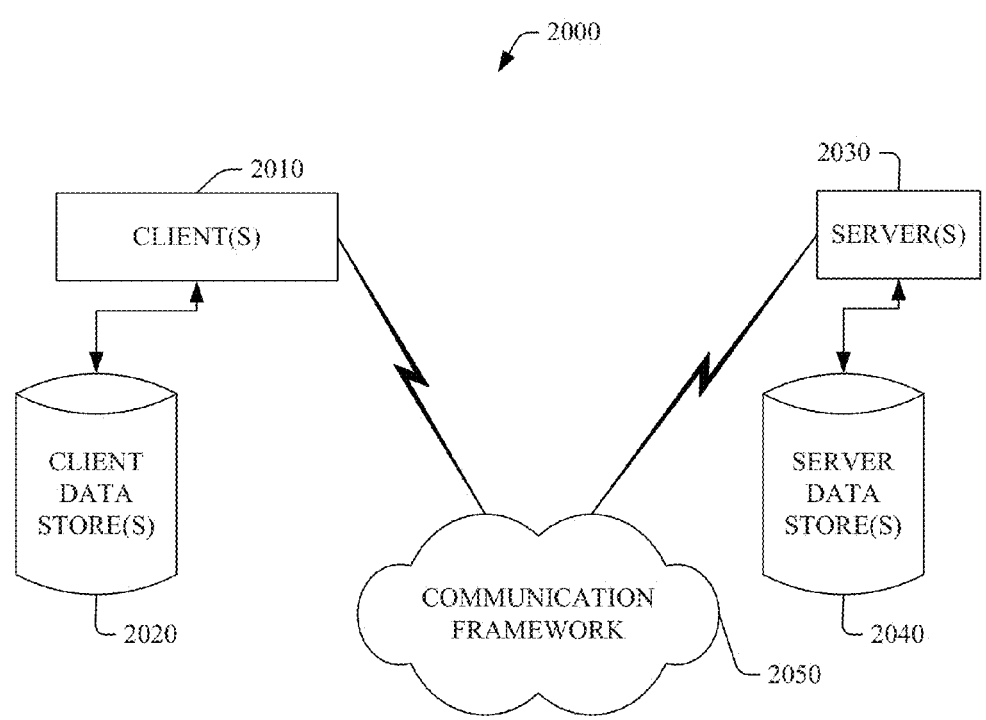
FIG. 20 is a schematic block diagram of a sample-computing environment.

In order to provide a context for the various aspects of the disclosed subject matter, FIGS. 19 and 20 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 19, a suitable environment 1900 for implementing various aspects of the claimed subject matter includes a computer 1912. The computer 1912 includes a processing unit 1914, a system memory 1916, and a system bus 1918. It is to be appreciated that the computer 1912 can be used in connection with implementing one or more of the systems or components (e.g., HGC, DMPH generator component, display component, etc.) shown and/or described in connection with, for example, FIGS. 1-14. The system bus 1918 couples system components including, but not limited to, the system memory 1916 to the processing unit 1914. The processing unit 1914 can be any of various available processors. Dual microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable programmable ROM (EEPROM), or flash memory. Volatile memory 1920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1912 also can include removable/non-removable, volatile/non-volatile computer storage media. FIG. 19 illustrates, for example, a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1924 to the system bus 1918, a removable or non-removable interface is typically used, such as interface 1926).

It is to be appreciated that FIG. 19 describes software that acts as an intermediary between users and the basic computer resources described in the suitable operating environment 1900. Such software includes an operating system 1928. Operating system 1928, which can be stored on disk storage 1924, acts to control and allocate resources of the computer system 1912. System applications 1930 take advantage of the management of resources by operating system 1928 through program modules 1932 and program data 1934 stored either in system memory 1916 or on disk storage 1924. It is to be appreciated that the claimed subject matter can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapter 1942 is provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

FIG. 20 is a schematic block diagram of a sample-computing environment 2000 with which the subject disclosure can interact. The system 2000 includes one or more client(s) 2010. The client(s) 2010 can be hardware and/or software (e.g., threads, processes, computing devices). The system 2000 also includes one or more server(s) 2030. Thus, system 2000 can correspond to a two-tier client server model or a multi-tier model (e.g., client, middle tier server, data server), amongst other models. The server(s) 2030 can also be hardware and/or software (e.g., threads, processes, computing devices). The servers 2030 can house threads to perform transformations by employing the subject disclosure, for example. One possible communication between a client 2010 and a server 2030 may be in the form of a data packet transmitted between two or more computer processes.

The system 2000 includes a communication framework 2050 that can be employed to facilitate communications between the client(s) 2010 and the server(s) 2030. The client(s) 2010 are operatively connected to one or more client data store(s) 2020 that can be employed to store information local to the client(s) 2010. Similarly, the server(s) 2030 are operatively connected to one or more server data store(s) 2040 that can be employed to store information local to the servers 2030.

It is to be appreciated and understood that components (e.g., holographic generator component, hologram enhancer component, expander component, interpolator component, processor component, look-up table, data store, display component, etc.), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   at least one memory that stores computer executable components; and
   at least one processor that facilitates execution of the computer executable components stored in the at least one memory, the computer executable components, comprising:
      a holographic generator component that generates a hologram, based at least in part on an object scene, wherein the hologram corresponds to the object scene; and
      a facilitator component that generates a grating, generates a mask based at least in part on the object scene, and overlays the mask on the grating to facilitate generation of the hologram by the holographic generator component.

2. The system of claim 1, wherein the grating is a high-resolution grating and the mask is a low-resolution mask, and the high-resolution grating has a higher resolution than the low-resolution mask.

3. The system of claim 2, wherein a pixel size of the mask is greater than a pixel size of the grating by a defined factor, and the defined factor is based at least in part on the pixel size of the mask.

4. The system of claim 1, wherein the facilitator component superposes the mask and the grating to facilitate the generation of the hologram.

5. The system of claim 1, wherein the facilitator component generates the grating as one of a first grating having a random binary pattern, a second grating having a periodic pattern based at least in part on a mathematical function, or a third grating that comprises pixels having randomly assigned degrees of transparency.

6. The system of claim 1, wherein the facilitator component generates the mask as one of a first binary mask having pixels that are opaque or transparent, or a second mask that includes pixels that respectively have transparency levels ranging from transparent to opaque.

7. The system of claim 1, wherein the facilitator component identifies the mask based at least in part on an objective function that is defined to determine an error between a reconstructed image relating to the hologram and a planar target image relating to the hologram.

8. The system of claim 7, wherein the facilitator component identifies the mask based at least in part on the objective function being at least substantially minimized, in accordance with a defined hologram generation criterion.

9. The system of claim 8, wherein the facilitator component performs a process, based at least in part on at least one of a simple genetic algorithm, a particle swarm optimization process, or a differential evolution process, to facilitate identification of the mask.

10. The system of claim 1, wherein the facilitator component encrypts the mask based at least in part on an encryption key, and generates the grating for use in part as the encryption key to facilitate decryption of the mask and reconstruction of the hologram by a display component.

11. The system of claim 1, further comprising a display component that includes one or more display units that generate and display one or more holographic images based at least in part on the hologram.

12. The system of claim 11, wherein a display unit of the one or more display units is a liquid crystal display device or a liquid crystal on silicon display device.

13. The system of claim 12, wherein the display unit has a dot-pitch of about 20 microns or more.

14. The system of claim 12, wherein the display unit is partitioned into a tile structure comprising a set of tiles, and respective tiles of the set of tiles display respective holographic images associated with the hologram.

15. The system of claim 1, wherein the object scene is a three-dimensional object scene, and the hologram is a full-parallax three-dimensional hologram.

16. A method, comprising:
   generating, by a system including at least one processor, a grating pattern;
   generating, by the system, a mask pattern based at least in part on an object scene and the grating pattern; and
   overlaying, by the system the mask pattern on to the grating pattern to facilitate generating a hologram that corresponds to the object scene.

17. The method of claim 16, further comprising:
   generating the grating pattern having a first resolution; and generating the mask pattern having a second resolution, wherein the first resolution is a higher resolution than the second resolution.

18. The method of claim 16, further comprising:
generating the grating pattern as one of a first grating pattern having a random binary pattern, a second grating pattern having a periodic pattern, or a third grating pattern that comprises pixels having randomly assigned degrees of transparency; and
generating the mask pattern as one of a first binary mask pattern having each pixel being opaque or transparent, or a second mask pattern that includes pixels that respectively have transparency levels ranging from transparent to opaque.

19. The method of claim 16, further comprising:
determining the mask pattern based at least in part on an objective function that is defined to determine an error between a reconstructed image relating to the hologram and a planar target image relating to the hologram.

20. The method of claim 19, further comprising:
determining the mask pattern based at least in part on the objective function being at least substantially minimized, in accordance with a defined hologram generation criterion that is based at least in part on a defined number of iterations to perform in an iterative process that facilitates the determining of the mask pattern.

21. The method of claim 20, further comprising:
determining the mask pattern using at least one of a simple genetic algorithm, a particle swarm optimization process, or a differential evolution process.

22. The method of claim 21, further comprising:
encrypting the mask pattern based at least in part on an encryption key; and
generating the grating pattern for use in part as the encryption key to facilitate decrypting the mask pattern and generating a holographic image that corresponds to the object scene.

23. The method of claim 16, further comprising:
arranging the mask pattern and the grating pattern in relation to an illumination beam to position the mask pattern between the grating pattern and the illumination beam to facilitate generating a holographic image that corresponds to the object scene.

24. The method of claim 16, further comprising:
arranging the mask pattern and the grating pattern in relation to an illumination beam to position the grating pattern between the mask pattern and the illumination beam to facilitate generating a holographic image that corresponds to the object scene.

25. The method of claim 16, further comprising:
partitioning a display screen of a display unit into a tile structure comprising a set of tiles, and respective tiles of the set of tiles display respective holographic images associated with the hologram.

26. A non-transitory computer readable storage medium comprising computer executable instructions that, in response to execution, cause a system including a processor to perform operations, comprising:
generating a grating image;
generating a mask image based at least in part on a three-dimensional object scene and the grating image; and
overlaying the mask image on to the grating image to facilitate generating a hologram that corresponds to the three-dimensional object scene.

27. The non-transitory computer readable storage medium of claim 26, wherein the operations further comprise:
determining the mask image as a function of an objective function that is defined to determine a root mean square error between a reconstructed image relating to the hologram and a planar target image relating to the hologram.

28. A system, comprising:
means for generating a grating;
means for generating a mask based at least in part on a three-dimensional object scene and the grating; and
means for superposing the mask and the grating to facilitate generating a hologram that corresponds to the three-dimensional object scene.

29. The system of claim 28, further comprising:
means for determining the mask as a function of an objective function that is defined to determine an error between a reconstructed image relating to the hologram and a planar target image relating to the hologram.

* * * * *